(12) United States Patent
Hunt et al.

(10) Patent No.: US 11,726,069 B2
(45) Date of Patent: Aug. 15, 2023

(54) METHODS AND SYSTEMS FOR EVALUATING A TARGET USING PULSED, ENERGETIC PARTICLE BEAMS

(71) Applicant: Corvid Technologies LLC, Mooresville, NC (US)

(72) Inventors: Sean Matthew Hunt, Raleigh, NC (US); Joseph Allen Johnson, Mooresville, NC (US)

(73) Assignee: Corvid Technologies LLC, Mooresville, NC (US)

( * ) Notice: Subject to any disclaimer, the term of this patent is extended or adjusted under 35 U.S.C. 154(b) by 68 days.

(21) Appl. No.: 17/370,340

(22) Filed: Jul. 8, 2021

(65) Prior Publication Data

US 2022/0091071 A1 Mar. 24, 2022

Related U.S. Application Data

(60) Provisional application No. 63/081,479, filed on Sep. 22, 2020.

(51) Int. Cl.
*G01N 29/24* (2006.01)
*G01N 29/04* (2006.01)
*G01N 29/22* (2006.01)

(52) U.S. Cl.
CPC ......... *G01N 29/2431* (2013.01); *G01N 29/04* (2013.01); *G01N 29/221* (2013.01); *G01N 29/2418* (2013.01); *G01N 2291/023* (2013.01); *G01N 2291/0289* (2013.01); *G01N 2291/102* (2013.01)

(58) Field of Classification Search
CPC .. G01N 29/2431; G01N 29/04; G01N 29/221; G01N 29/2418; G01N 29/265; G01N 2291/023; G01N 2291/0289; G01N 2291/102; G01N 2291/0231
See application file for complete search history.

(56) References Cited

U.S. PATENT DOCUMENTS

| 4,385,634 | A | 5/1983 | Bowen |
| 6,041,020 | A * | 3/2000 | Caron ................. H04R 23/008 367/149 |
| 9,789,339 | B2 | 10/2017 | Moskvin et al. |
| 2008/0014574 | A1 * | 1/2008 | Viator ................ G01N 21/1702 436/63 |

(Continued)

OTHER PUBLICATIONS

Agostinelli et al. "GEANT4—a Simulation Toolkit" Nuclear Instruments and Methods in Physics Research Section A: Accelerators, Spectrometers, Detectors and Associated Equipment 506(3):250-303 (Jul. 2003).

(Continued)

*Primary Examiner* — Helen C Kwok
(74) *Attorney, Agent, or Firm* — Myers Bigel, P.A.

(57) ABSTRACT

A method for evaluating a target, the target having a surface, includes pulsing a defined, energetic particle beam through the surface and into the target such that particle energy deposition from the particle beam is concentrated in a subsurface target volume within a target medium of the target. The deposited particle energy induces a thermoelastic expansion of the target medium in the target volume that generates a corresponding acoustic wave. The method further includes detecting the acoustic wave from the target medium.

27 Claims, 17 Drawing Sheets

(56) References Cited

U.S. PATENT DOCUMENTS

| | | |
|---|---|---|
| 2011/0048135 A1* | 3/2011 | Caron ................ G01N 29/2418 |
| | | 73/633 |
| 2017/0008126 A1* | 1/2017 | Long ...................... B22F 10/28 |
| 2017/0042428 A1* | 2/2017 | Kellnberger .......... A61B 5/7228 |
| 2017/0156600 A1* | 6/2017 | Ntziachristos ....... A61B 5/0077 |
| 2018/0344167 A1 | 12/2018 | Xiang et al. |
| 2019/0187161 A1* | 6/2019 | Deisseroth ............. G01N 33/92 |
| 2020/0141908 A1* | 5/2020 | Bingham ............. G01N 29/265 |
| 2020/0178941 A1* | 6/2020 | Thiagarajan ......... A61B 8/4483 |

OTHER PUBLICATIONS

Cavuto et al. "Laser-Ultrasonics Wave Generation and Propagation FE Model in Metallic Materials" COMSOL Conference (2013).

Hickling et al. "Ionizing radiation-induced acoustics for radiotherapy and diagnostic radiology applications" Medical Physics 45(7):707-721 (Jul. 2018).

Muray et al. "Experimental Evaluation of an Electron-Beam Pulse Modulated Blanker (160 MHz) for Next-Generation Electron-Beam Raster Scan Systems" Journal of Vacuum Science & Technology B: Microelectronics and Nanometer Structures Processing 13:2488 (1995).

Urchulutegui, M. "Scanning Electron-Acoustic Microscopy: Do You Know Its Capabilities" MRS Bulletin 21(10):42-46 (1996).

Xu et al. "Thermoelastic finite element modeling of laser generation ultrasound" Journal of Applied Physics 99:033508 (2006).

\* cited by examiner

METHODS AND SYSTEMS FOR EVALUATING A TARGET USING PULSED, ENERGETIC PARTICLE BEAMS

RELATED APPLICATION

The present application claims the benefit of and priority from U.S. Provisional Patent Application No. 63/081,479, filed Sep. 22, 2020, the disclosure of which is incorporated herein by reference in its entirety.

STATEMENT OF GOVERNMENT SUPPORT

This invention was made with support under Small Business Innovation Research (SBIR) Contract No. 80NSSC-19-C-0583 awarded by the National Aeronautics and Space Administration (NASA). The Government has certain rights in the invention.

FIELD OF THE INVENTION

The present invention relates to methods and systems for nondestructive evaluation of materials and structures.

BACKGROUND

Nondestructive evaluation (NDE) of unique structures and composite materials is a complex problem that has driven the development of new sensing techniques and associated data analysis algorithms. In addition to difficult-to-analyze materials or structures, many components are sensitive to possible contamination or destructive damage from physical contact, thus requiring non-contact approaches for evaluation. Innovative concepts that provide valuable NDE data without requiring contact, such as laser-induced ultrasound, advanced thermal mapping techniques, advanced X-ray imaging methods, and various electromagnetic wave inspection techniques are in especially high demand because of the fragile nature of many objects being studied. Each of these methods mentioned offers advantages in specific applications, but may be limited by shadowing effects resulting from layered defects, shallow penetration depth, inhibitive material properties, or component geometry.

SUMMARY

According to some embodiments, a method for evaluating a target, the target having a surface, includes pulsing a defined, energetic particle beam through the surface and into the target such that particle energy deposition from the particle beam is concentrated in a subsurface target volume within a target medium of the target. The deposited particle energy induces a thermoelastic expansion of the target medium in the target volume that generates a corresponding acoustic wave. The method further includes detecting the acoustic wave from the target medium.

In some embodiments, the acoustic wave is an ultrasonic wave.

According to some embodiments, the particle beam is an electron beam.

In some embodiments, the method includes focusing the electron beam to concentrate the particle energy deposition from the electron beam in the target medium in the target volume.

In some embodiments, focusing the electron beam includes focusing the electron beam using a lens system having a focal point located in the target volume.

The lens system may include an electromagnetic lens.

According to some embodiments, the electromagnetic lens is a defocusing/focusing lens, and focusing the electron beam includes focusing a collimated electron beam at the focal point using the defocusing/focusing lens.

According to some embodiments, the particle beam is a proton beam.

In some embodiments, the proton beam is a collimated proton beam.

In some embodiments, the method includes focusing the proton beam to concentrate the particle energy deposition from the proton beam in the target medium in the target volume.

In some embodiments, the method includes selecting an energy of the proton beam such that the Bragg peak of the proton beam is located at a selected depth in the target volume.

According to some embodiments, the particle beam is an X-ray beam.

In some embodiments, the method includes focusing the X-ray beam to concentrate the particle energy deposition from the X-ray beam in the target medium in the target volume.

In some embodiments, focusing the X-ray beam includes focusing the X-ray beam using a lens system having a focal point located in the target volume.

According to some embodiments, the method includes: scanning the particle beam across the target such that particle energy deposition from the particle beam is sequentially concentrated in a series of subsurface target volumes within the target; and pulsing the particle beam while scanning the particle beam across the target.

According to some embodiments, detecting the acoustic wave from the target volume includes detecting the acoustic wave using a transducer that converts the acoustic wave to an electrical signal.

In some embodiments, the method includes processing the electrical signal to characterize the target medium.

In some embodiments, processing the electrical signal to characterize the target medium includes identifying the presence of a discontinuity in the target.

In some embodiments, processing the electrical signal to characterize the target medium includes characterizing the size of a defect in the target.

In some embodiments, processing the electrical signal to characterize the target medium includes characterizing a bond between multiple layers in the target.

In some embodiments, the transducer is in contact with the target.

In some embodiments, the transducer does not contact the target.

According to some embodiments, the target includes an intervening object and a gap defined between the intervening object and the target medium, and the particle beam passes through the intervening object and the gap prior to entering the target volume.

According to some embodiments, the target medium includes a subsurface void defined therein, and the particle beam passes through the void prior to entering the target volume.

According to some embodiments, a method for evaluating a target, the target having a surface, includes pulsing a plurality of X-ray beams through the surface and into the target such that the plurality of X-ray beams converge in a subsurface target volume within the target, wherein particle energy deposition from the plurality of X-ray beams is concentrated at the target volume in a target medium of the target. The deposited particle energy induces a thermoelastic expansion of the target medium in the target volume that generates a corresponding acoustic wave. The method further includes detecting the acoustic wave from the target medium.

In some embodiments, the acoustic wave is an ultrasonic wave.

In some embodiments, the method includes: scanning the plurality of X-ray beams across the target such that particle energy deposition from the plurality of X-ray beams is sequentially concentrated in a series of subsurface target volumes within the target; and pulsing the plurality of X-ray beams while scanning the plurality of X-ray beams across the target.

In some embodiments, detecting the ultrasonic wave from the target volume includes detecting the acoustic wave using a transducer that converts the acoustic wave to an electrical signal.

In some embodiments, the method includes processing the electrical signal to characterize the target medium.

In some embodiments, processing the electrical signal to characterize the target medium includes identifying the presence of a discontinuity in the target.

In some embodiments, processing the electrical signal to characterize the target medium includes characterizing the size of a defect in the target.

In some embodiments, processing the electrical signal to characterize the target medium includes characterizing a bond between multiple layers in the target.

According to some embodiments, a system for evaluating a target, the target having a surface, includes an energetic particle beam generator configured to pulse a defined, energetic particle beam through the surface and into the target such that particle energy deposition from the particle beam is concentrated in a subsurface target volume within a target medium of the target. The deposited particle energy induces a thermoelastic expansion of the target medium in the target volume that generates a corresponding acoustic wave. The system further includes an acoustic sensor configured to detect the acoustic wave from the target medium.

In some embodiments, the acoustic wave is an ultrasonic wave.

According to some embodiments, a system for evaluating a target, the target having a surface, includes an energetic particle beam generator configured to pulse a plurality of X-ray beams through the surface and into the target such that the plurality of X-ray beams converge in a subsurface target volume within the target, wherein particle energy deposition from the plurality of X-ray beams is concentrated at the target volume in a target medium of the target. The deposited particle energy induces a thermoelastic expansion of the target medium in the target volume that generates a corresponding acoustic wave. The method further includes an acoustic sensor configured to detect the acoustic wave from the target medium.

In some embodiments, the acoustic wave is an ultrasonic wave.

DESCRIPTION

Figure 1:
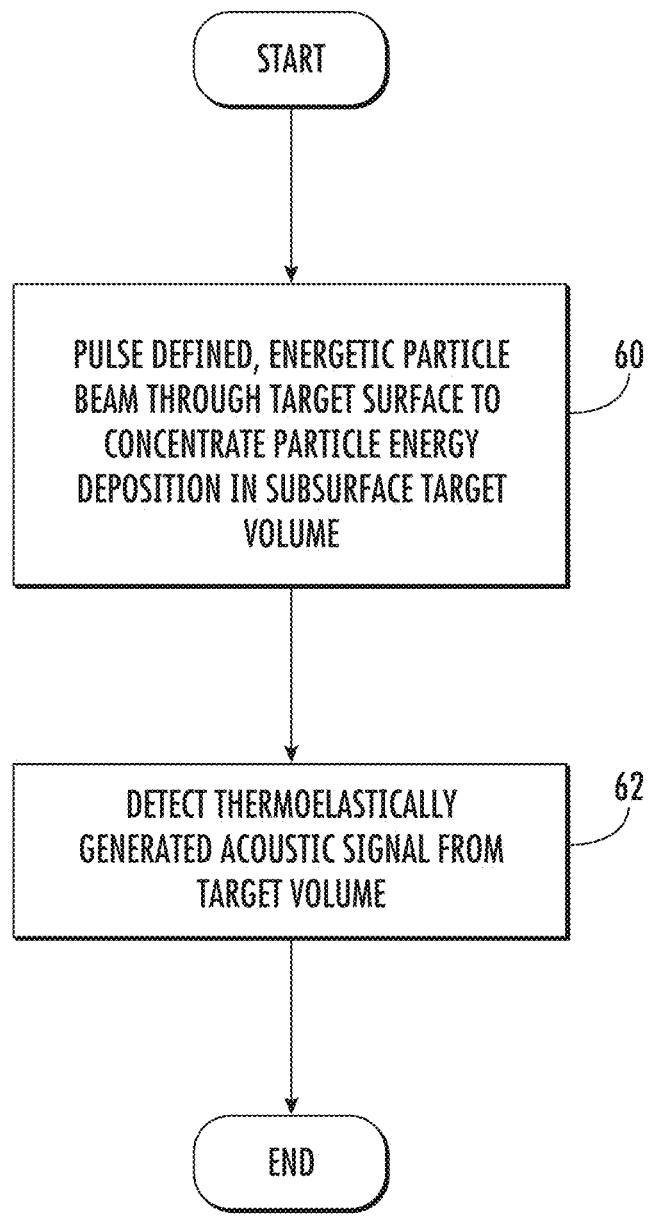
FIG. 1 is a flow chart representing methods for evaluating a target using pulsed radiation-induced acoustics (PRIA) according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

As used herein, "monolithic" means an object that is a single, unitary piece formed or composed of a material without joints or seams.

In the description below, reference numbers used to describe components or features of different embodiments are intended to denote the same components or features in each embodiment.

The present invention is directed to methods and systems for nondestructive evaluation of structures and materials. Techniques of the present invention may be referred to herein as Pulsed Radiation-Induced Acoustics (PRIA) methods, techniques or technology. In PRIA methods, a pulsed radiation beam or beams is/are concentrated at a selectable, prescribed subsurface depth within a target, thereby inducing a thermoelastic acoustic wave in the target medium. The thermoelastic acoustic wave is dependent on the geometry of the target, the material properties of the target, and excitation characteristics. The PRIA method can be used to characterize the target, including characterizing the material of the target and/or structural features (e.g., flaws) within the target. In some embodiments, the thermoelastic acoustic wave is an ultrasonic wave.

Embodiments of the invention can be implemented such that the evaluation is not hindered by air gaps, delamination, or material boundaries within the target. The PRIA method can also be completely non-contact and can be paired with conventional and well-understood non-contact sensing methods for acoustic or ultrasonic waves, such as laser interferometry.

The PRIA method offers at least two benefits over conventional laser-induced ultrasound. First, the PRIA method offers a way to detect defects that are currently impossible to find using traditional ultrasonic methods. Additionally, in the PRIA method the surface condition of the target material does not impede the energy absorption. Reflective or clear materials will both convert energy from massive particle beams or X-ray beams via the thermoelastic acoustic effect as described below.

A system for executing PRIA methods according to embodiments of the invention may include components for the creation and detection of pulsed radiation-induced acoustics (PRIA). In some embodiments, the system includes a particle beam source (such as a particle accelerator or an X-ray source), structural members, and sensors (e.g., transducers) for detection of the resulting radiation-induced acoustic waves.

The system may include a mechanism for concentrating the energy deposition of the particles. The mechanism for concentrating the energy deposition of the particles may include a focusing mechanism (e.g., electromagnetic lenses), multiple particle beam sources, or a Bragg peak calibration mechanism.

The sensors for detection of the radiation-induced acoustic waves will depend on the application. In some embodiments, the sensors are contact type acoustic sensors such as piezoelectric high-frequency sensors. In some embodiments, the sensors are non-contact type acoustic sensors such as a laser vibrometer. The sensors may be accompanied by additional signal conditioners and data processors, and in the case of a laser sensor, steering systems or mirrors.

In some embodiments, the PRIA system is embodied as an integral device, apparatus or equipment. The system or device may further include additional structural members, such as, but not limited to, an optical breadboard, a positioning system (e.g., a gantry system), or a support frame.

FIG. 1 is a flow chart representing PRIA methods according to some embodiments for evaluating a target. A pulsed, defined, energetic particle beam is generated and directed through a surface of the target and into the target such that particle energy deposition from the particle beam is concentrated in a subsurface target volume within a target medium of the irradiated target (Block 60). The deposited particle energy induces a thermoelastic expansion of the target medium in the target volume that generates a corresponding acoustic wave. The method further includes detecting the acoustic wave from the target medium (Block 62). In some embodiments, the energetic particle beam is a pulsed, energetic massive particle beam. In some embodiments, the energetic massive particle beam is generated using a particle accelerator that propels charged particles to high velocities and energies. In some embodiments, the pulsed, energetic massive particle beam is a pulsed, energetic electron beam. In some embodiments, the pulsed, energetic massive particle beam is a pulsed, energetic proton beam. In some embodiments, the energetic particle beam is a pulsed X-ray beam. In some embodiments, the acoustic wave is an ultrasonic wave.

Figure 2:
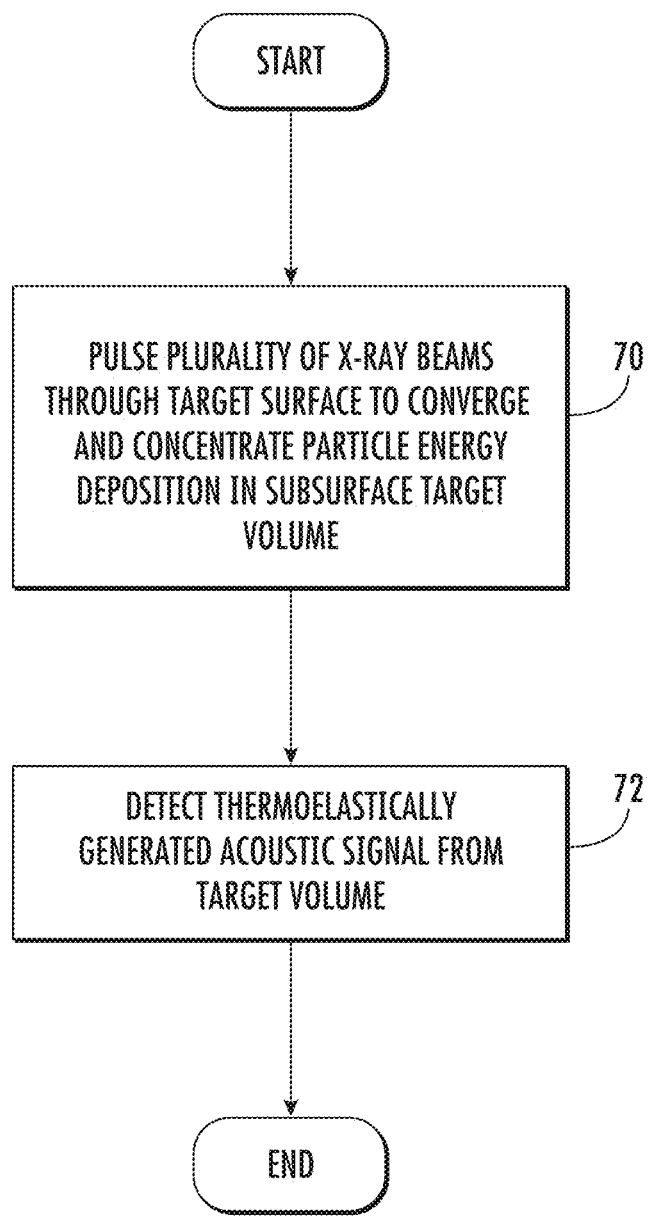
FIG. 2 is a flow chart representing methods for evaluating a target using PRIA according to further embodiments.

FIG. 2 is a flow chart representing PRIA methods according to further embodiments for evaluating a target. A plurality of pulsed X-ray beams are generated and directed through a surface of the target and into the target and the plurality of X-ray beams converge in a subsurface target volume within the target such that particle energy deposition from the plurality of X-ray beams is concentrated at the target volume in a target medium of the irradiated target (Block 70). The deposited particle energy induces a thermoelastic expansion of the target medium in the target volume that generates a corresponding acoustic wave. The method further includes detecting the acoustic wave from the target medium (Block 72). In some embodiments, the acoustic wave is an ultrasonic wave.

Figure 3:
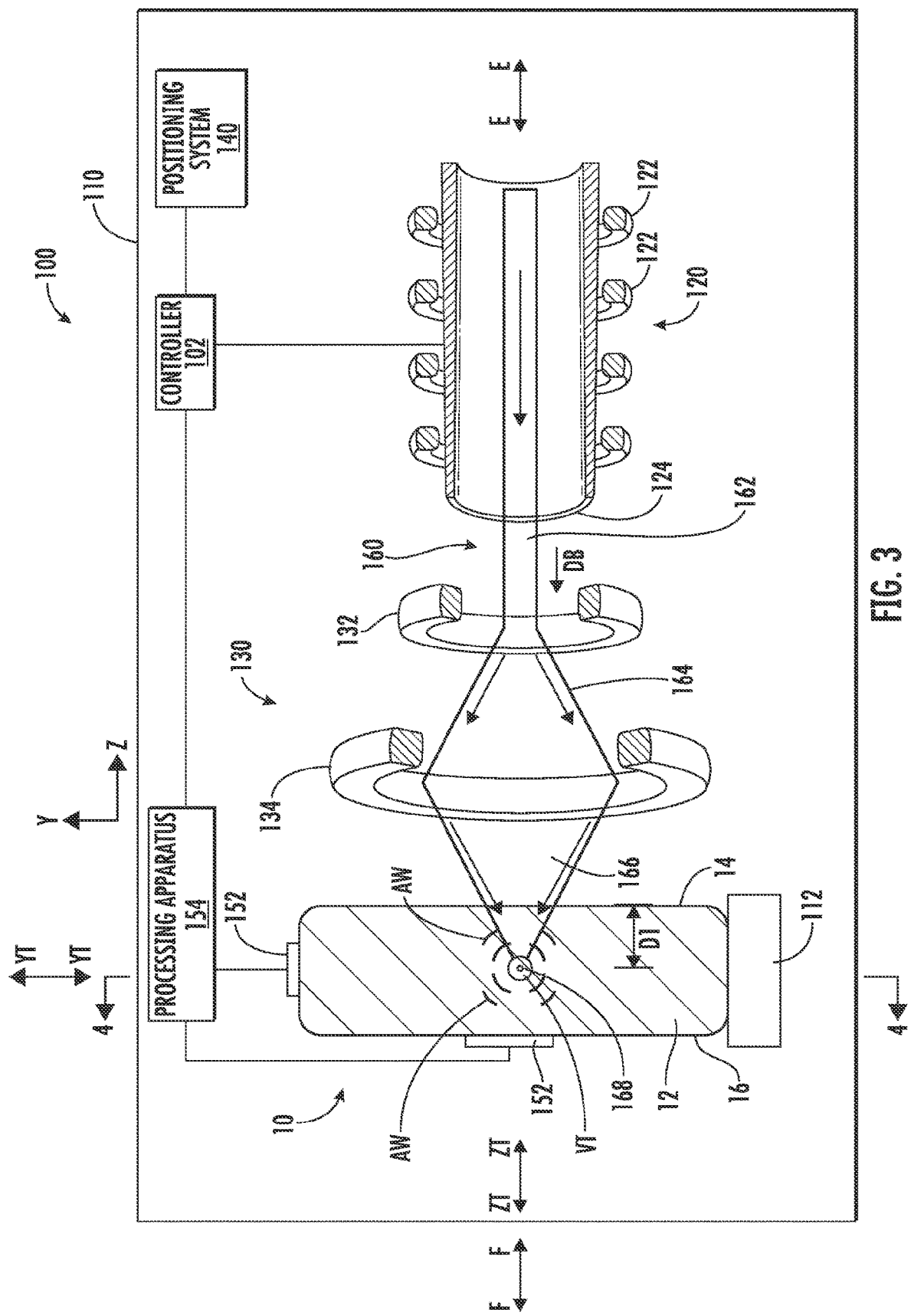
FIG. 3 is a schematic view of a PRIA system according to some embodiments.
Figure 4:
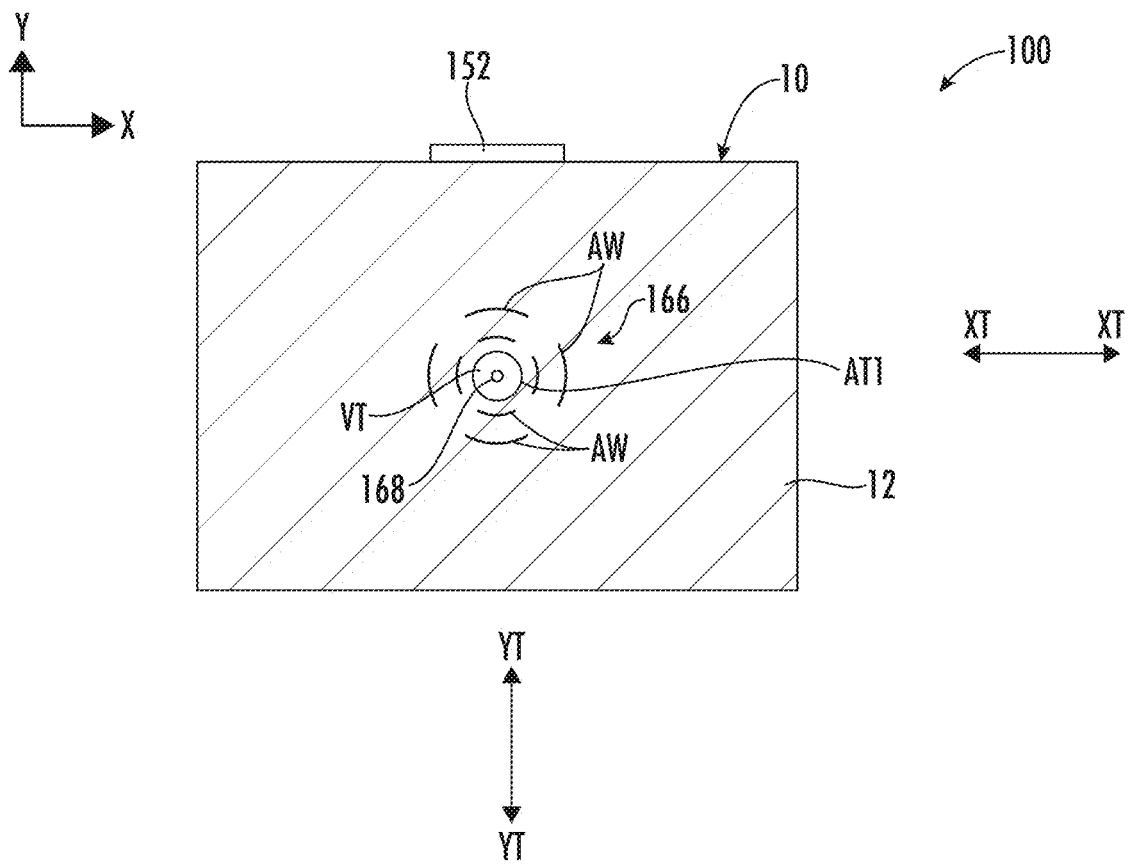
FIG. 4 is a schematic, cross-sectional view of the PRIA system of FIG. 3 taken along the line 4-4 of FIG. 3.

With reference to FIGS. 3 and 4, a PRIA system 100 according to some embodiments is shown therein. The system 100 can be used to nondestructively evaluate a target 10, for example. The PRIA system 100 is configured to irradiate the target 10 with a focused energetic electron beam 160. The system 100 is configured to control the electron beam 160 relative to the target 10 in three dimensions, which are indicated for reference as a Z-axis, an X-axis, and a Y-axis.

The target may be any suitable object. The system 100 may be used to detect, determine or characterize a material of the target 10 or a structural feature of the target 10. The structural feature may be a void, flaw, inclusion or defect, for example. In some embodiments, the target medium 12 is formed of a metal (e.g., titanium), ceramic, or carbon fiber (CF) composite.

The target 10 includes a target body 12 formed of a target medium. In the illustrated embodiment, the target body 12 is formed entirely of the target medium and therefore may be referred to herein as the target body and the target medium 12.

The target body 12 has opposing front and rear surfaces 14 and 16. The target body 12 has a depthwise axis ZT, a widthwise axis XT perpendicular to the depthwise axis ZT, and a heightwise axis YT perpendicular to the depthwise axis ZT and the widthwise axis XT.

The PRIA system 100 includes a controller 102, an energetic electron beam generator 120, a lens system 130, a detection system 150, and a positioning system 140. The system 100 may further include a frame support structure 110.

The electron beam generator 120, the lens system 130, the detection system 150, and the positioning system 140 may all be mounted on the support structure 110 to form an integrated device. The support structure 110 may include a target holder 112 configured to hold or support the target 10 in a fixed or prescribed location with respect to the beam generator 120.

The electron beam generator 120 is configured to generate a beam 160 of energetic electrons. The electron beam generator 120 may be any suitable device for generating a pulsed electron beam as discussed herein. In some embodiments, the electron beam generator 120 is a particle accelerator that uses electromagnetic fields to propel electrons to high velocities and energies out of a generator outlet 124 along an emission axis E-E. The electromagnetic fields may be generated using electromagnets 122, for example.

The lens system 130 may include one or more electromagnetic lenses. In some embodiments, the lens system 130 includes an electromagnetic defocusing lens 132 and an electromagnetic focusing lens 134 serially arranged between the generator 120 and the target 10.

The detection system 150 includes one or more acoustic sensors 152, processing apparatus 154, and wired or wireless connections between the sensors 152 and the processing apparatus 154. The sensors 152 and the processing apparatus 154 together form an acoustic wave detector.

The sensors 152 may be an array of sensors or transducers. The sensor array may be one-dimensional array or a two-dimensional array. Linear array or curvilinear array, for example.

The sensors 152 may be transducers that convert incident acoustic wave energy to electrical signals. The sensors 152 may be any suitable sensors. In some embodiments, the sensors 152 are contact type acoustic sensors, such as thin film or high frequency piezoelectric sensors. The contact type acoustic sensors 152 may be mounted on or in the target body 12. In some embodiments, the sensors 152 are non-contact acoustic sensors, such as laser vibrometers.

The processing apparatus 154 may include hardware and software as needed to process the signals generated by the sensors 152 and the data embodied in the signals. For example, the processing apparatus 154 may include signal conditioners, signal amplifiers, and/or a transmitter. The processing apparatus 154 may include a computer processor operative to evaluate and report the sensor data, or may relay the sensor data to the controller 102 or another computing device to evaluate and report the sensor data.

The positioning system 140 is operable to adjust the relative positions of the target 10 and the particle beam 160. The positioning system 140 may include one or more actuators and mechanisms (e.g., a gantry) to effect these adjustments. In some embodiments, the positioning system 140 includes a steering system operable to control the direction of the particle beam 160 relative to the target 10.

The electron beam 160 propagates in a beam direction DB from the generator 120 to the target 10. The electron beam 160 includes multiple sections 162, 164, 166, 168 arranged serially from the generator 120 to the target 10. The electron beam 160 includes a parallel beam 162 extending from the generator outlet 124 to the lens 132. The parallel beam 162 is converted to a defocused beam 164 by the lens 132. The defocused beam is converted to a focused beam 166 by the lens 134. The focused beam 166 is focused by the focusing lens 134 to a focal point 168. It will be appreciated that the lens system 130 may include more than two lenses and the PRIA system 100 may include other elements for focusing or directing the electron beam 160.

The PRIA system 100 may be used as follows. The target 10 is mounted on the target holder 112. The electron beam generator 120 is operated to generate a pulse or sequential pulses of the electron beam 160 that irradiate the target 10. The energy of the electron beam 160 and/or the spatial positions of the electron beam generator 120, the lens system 130, and the target 10 are set, selected or adjusted to position the beam focal point 168 at a selected or prescribed target location in the target 10. The target location is spatially located at a subsurface location within the target body 12 between the surfaces 14 and 16.

More particularly, the energetic electrons of the electron beam 160 penetrate through the front surface 14 and the subsurface bulk or medium of the target body 12 to a location or locations substantially coincident with the beam focal point 168. The electrons of the electron beam 160 incident at and closely proximate the beam focal point 168 deposit their energy in the target medium 12 in a target volume VT at or closely surrounding the beam focal point 168 (i.e., local to the focal point 168). This time varied energy absorption induces a rapid thermoelastic expansion of the target medium in the target volume VT. This thermoelastic expansion in turn generates a corresponding thermoacoustic wave AW. The thermoacoustic wave AW propagates through the target medium 12 and is incident on one or more of the sensors 152. The thermoacoustic wave AW is converted by the sensor 152 to a signal that is received by the processing apparatus 154.

The received signal is then data processed (e.g., by the controller 102 and/or the processing apparatus 154) to characterize the target medium 12. The processing and characterization may include any suitable processes and techniques for characterizing or evaluating the material or structure of the target medium 12. For example, the system 100 may conduct the foregoing PRIA procedure (i.e., irradiate the target 10 at a subsurface location, and detect the thermoacoustic waves induced thereby) at multiple different locations within the target 10. That is, the system 100 can be used to sample multiple locations in the target 10. The acoustic signals corresponding to each sampling can then be compared or mapped by a processor. In this way, the system 100 can identify, detect or show the existence or presence and relative locations of discontinuities in the target 10, such as defects, voids, material variations, inclusions, or different layers.

Notably, as a result of the well-defined, focused electron beam 160, the particle energy deposition from the electron beam 160 is concentrated in the subsurface target volume VT. The beam focal point 168 and the target volume VT are located at a positive, non-zero depth D1 (FIG. 3) (i.e., the penetration depth) from the front surface 14. Additionally, a target area AT1 (FIG. 4) (i.e., the lateral area in a plane orthogonal to the incident beam axis F-F) of the particle energy deposition concentration is constrained. In this manner, the particle energy deposition concentration is constrained in its depth and its lateral extent.

It will be appreciated that a portion of the beam particle energy from the particle beam 160 will be deposited in the target medium between the surface 14 and the target volume VT, and a portion of the particle energy from the particle beam 160 may be deposited in the target medium between the surface 16 and the target volume VT. As used herein, "the particle energy deposition from the electron beam 160 is concentrated" means that the energy density ([beam particle energy absorbed by target medium] per [unit volume]) of the particle energy deposition from the electron beam 160 is greatest in the target volume VT. That is, the target medium in the target volume VT absorbs more particle energy per unit volume than the medium in any other volume of the target 10. In some embodiments, throughout the target volume VT the energy density of the electron beam particle energy deposition is at least 10 times the energy density of the electron beam particle energy deposition at the front surface 14.

The differential concentration of the particle energy deposition in the target volume VT correspondingly differentially concentrates the heating of the target medium at the target volume VT. As a result, the radiation-induced thermoelastic expansion of the target medium in the target volume VT is substantially greater or more pronounced as compared to the radiation-induced thermoelastic expansion of the target medium outside of the target volume VT. Accordingly, the resulting thermoelastically-generated acoustic wave from the target volume VT is substantially greater or more pronounced as compared to the thermoelastically-generated acoustic wave (if any) from the target medium outside of the target volume VT. In some embodiments, the particle energy deposition outside of the target volume VT is insufficient to induce thermoelastic expansion of the target medium there, or is insufficient to induce thermoelastic expansion of the target medium there that is sufficient to generate an acoustic wave detectable by the detection system 150.

In some embodiments, the duration of the pulse of the electron beam 160 is in the range of from 5 nanoseconds to 100 nanoseconds.

In some embodiments, the electron energy of the electron beam 160 is in the range of from 1 MeV to 20 MeV.

In some embodiments, the depth D1 (i.e., the distance from the beam focal point 168 to the front surface 14) is at least 5 mm and, in some embodiments, is at least 2 cm. In embodiments, the depth D1 is in the range of from about 1 mm to 5 cm.

In some embodiments, the area AT1 of the electron beam 166 at the focal point 168 is less than 1 mm$^2$ and, in some embodiments, is less than 0.1 mm$^2$. In embodiments, the area AT1 of the electron beam 166 at the focal point 168 is in the range of from about 0.1 mm$^2$ to 2 mm$^2$.

In some embodiments, the incident electron beam 166 is laterally scanned across the target 10 (i.e., in directions along the X-axis and the Y-axis). Is some embodiments, the incident electron beam 166 is scanned depthwise within the target 10 (i.e., along the Z-axis). In some embodiments, the incident electron beam 166 is scanned both laterally and depthwise. The scanning may be executed by the positioning system 140 and/or by adjusting parameters of the electron beam (e.g., the beam energy and/or the focal point of the lens system 130).

The several systems of the PRIA system 100 can be operated by the controller 102. In some embodiments, the controller 102 electronically, automatically and programmatically executes the steps of generating and pulsing the electron beam, positioning the beam and/or target, and detecting and processing the acoustic waves as described above.

In some embodiments, the thermoelastic acoustic wave AW is an ultrasonic wave. In some embodiments, the thermoelastic acoustic wave AW is an ultrasonic wave having a frequency range that is dependent on the target material and geometry characteristics, as well as the characteristics of the electron beam 166. In some embodiments, the acoustic wave AW has multiple frequency components, ranging from 1 MHz to 100 GHz.

Figure 5:
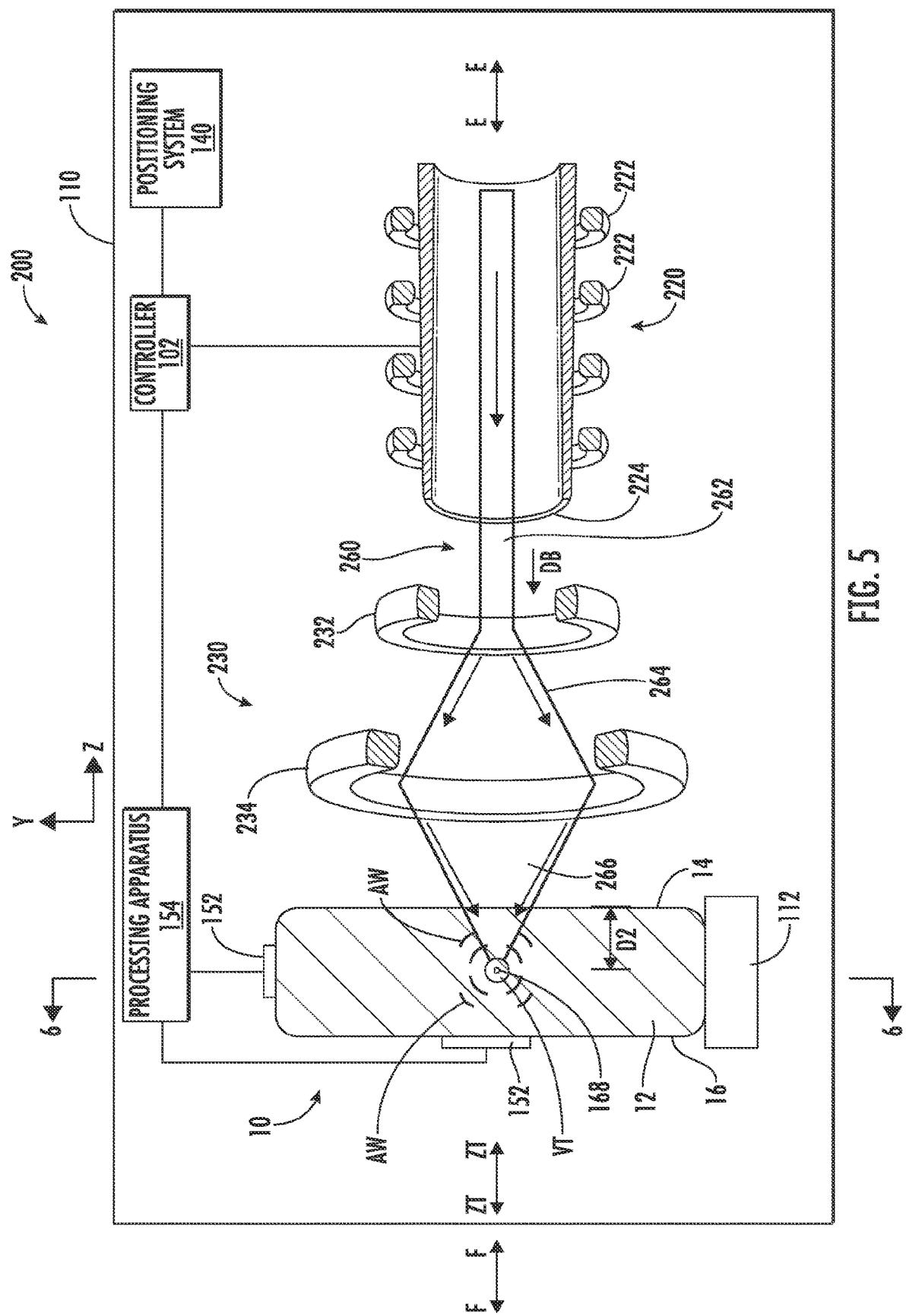
FIG. 5 is a schematic view of a PRIA system according to some embodiments.
Figure 6:
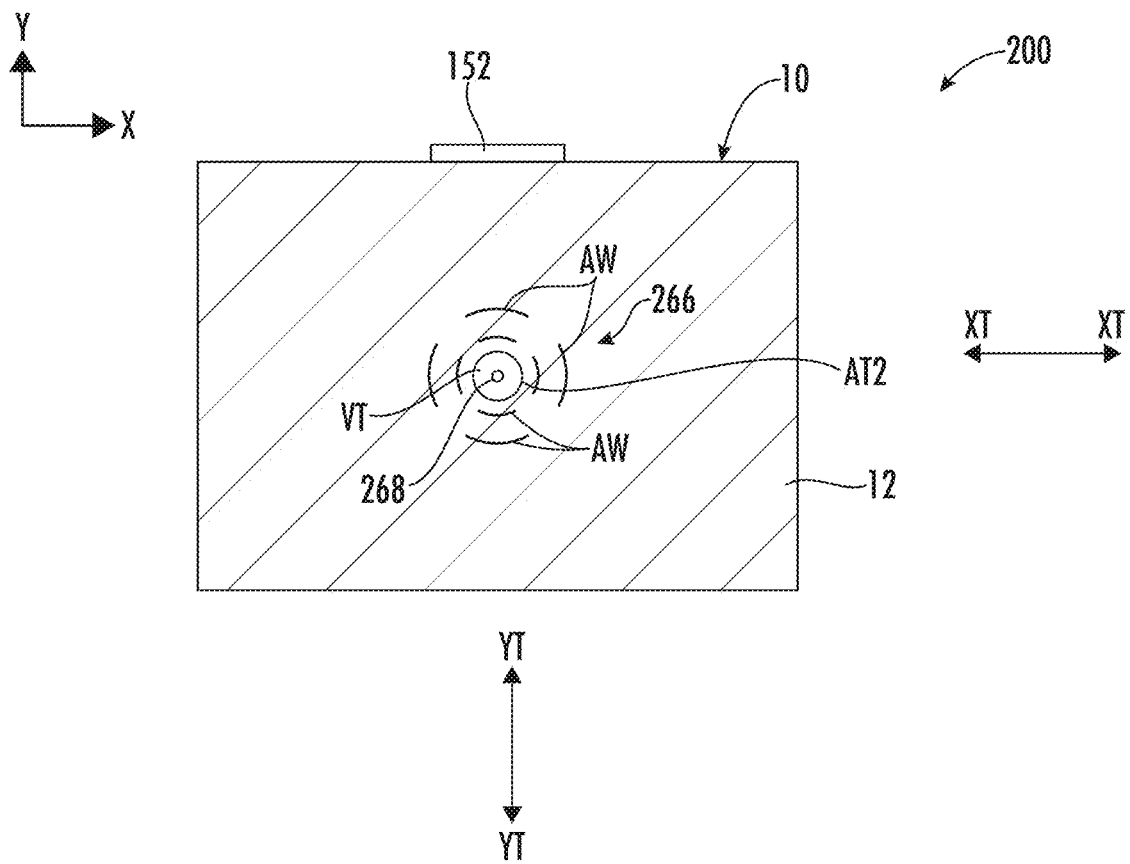
FIG. 6 is a schematic, cross-sectional view of the PRIA system of FIG. 5 taken along the line 6-6 of FIG. 5.

With reference to FIGS. 5 and 6, a PRIA system 200 according to further embodiments is shown therein. The system 200 can be used to nondestructively evaluate a target 10, for example. The PRIA system 200 is configured to irradiate the target 10 with a focused energetic proton beam 260. The system 200 is configured to control the proton beam 260 relative to the target 10 in three dimensions, which are indicated for reference as a Z-axis, an X-axis, and a Y-axis.

The system 200 may be constructed and operated in the same manner as the PRIA system 100, except as discussed below.

The PRIA system 200 includes a proton beam generator 220 in place of the electron beam generator 120.

The proton beam generator 220 is configured to generate a beam 260 of energetic protons. The proton beam generator 220 may be any suitable device for generating a pulsed proton beam as discussed herein. In some embodiments, the proton beam generator 220 is a particle accelerator that uses electromagnetic fields to propel protons to high velocities and energies out of a generator outlet 224 along an emission axis E-E. The electromagnetic fields may be generated using electromagnets 222, for example.

The PRIA system 200 also includes a beam focusing lens system 230. In some embodiments, the lens system 230 includes an electromagnetic defocusing lens 232 and an electromagnetic focusing lens 234 serially arranged between the generator 220 and the target 10.

The proton beam 260 propagates in a beam direction DB from the generator 220 to the target 10. The proton beam 260 includes multiple sections 162, 164, 166, 168 arranged serially from the generator 220 to the target 10. The proton beam 260 includes a parallel beam 262 extending from the generator outlet 224 to the lens system 230. The parallel beam 262 is converted to a defocused beam 264 by the lens 232. The defocused beam is converted to a focused beam 266 by the lens 234. The focused beam 266 is focused by the lens system 230 to a focal point 268.

The PRIA system 200 may be used as follows. The target 10 is mounted on the target holder 112. The proton beam generator 220 is operated to generate a pulse or sequential pulses of the proton beam 260 that irradiate the target 10. The energy of the proton beam 260 and/or the spatial positions of the proton beam generator 220, the lens system 230, and the target 10 are set, selected or adjusted to position the beam focal point 268 at a selected or prescribed target location in the target 10. The target location is spatially located at a subsurface location within the target body 12 between the surfaces 14 and 16.

More particularly, the energetic protons of the proton beam 260 penetrate through the front surface 14 and the subsurface bulk or medium of the target body 12 to a location or locations substantially coincident with the beam focal point 268. The protons of the proton beam 260 incident at and closely proximate the beam focal point 268 deposit their energy in the target medium in a target volume VT at or closely surrounding the beam focal point 268. This time varied energy absorption induces a rapid thermoelastic expansion of the target medium 12 in the target volume VT. This thermoelastic expansion in turn generates a corresponding thermoacoustic wave AW. The thermoacoustic wave AW propagates through the target medium 12 and is incident on one or more of the sensors 152. The thermoacoustic wave AW is converted by the sensor 152 to a signal that is data processed (e.g., by the controller 102) to characterize the target medium 12.

In some embodiments, the thermoelastic acoustic wave AW is an ultrasonic wave. In some embodiments, the thermoelastic acoustic wave AW is an ultrasonic wave having a frequency range that is dependent on the target material and geometry characteristics, as well as the characteristics of the proton beam 260. In some embodiments, the acoustic wave AW has multiple frequency components, ranging from 1 MHz to 100 GHz.

Notably, as a result of the well-defined, focused proton beam 260, the particle energy deposition from the proton beam 260 is concentrated in the subsurface target volume VT. The beam focal point 268 and the target volume VT are located at a positive, non-zero depth D2 (i.e., the penetration depth) from the front surface 14. Additionally, a target area AT2 (i.e., the lateral area in a plane orthogonal to the incident beam axis F-F) of the particle energy deposition concentration is constrained. In this manner, the particle energy deposition concentration is constrained in its depth and its lateral extent.

It will be appreciated that a portion of the beam particle energy from the particle beam 260 will be deposited in the target medium between the surface 14 and the target volume VT, and a portion of the particle energy from the particle beam 260 may be deposited in the target medium between the surface 16 and the target volume VT. As used herein, "the particle energy deposition from the proton beam 260 is concentrated" means that the energy density ([beam particle energy absorbed by target medium] per [unit volume]) of the particle energy deposition from the proton beam 260 is greatest in the target volume VT. That is, the target medium in the target volume VT absorbs more particle energy per unit volume than the medium in any other volume of the target 10. In some embodiments, throughout the target volume VT the energy density of the proton beam particle energy deposition from the focused proton beam 260 is at least 10 times the energy density of the proton beam particle energy deposition at the front surface 14.

As discussed above with regard to the PRIA system 100 and related method, the differential concentration of the particle energy deposition in the target volume VT correspondingly differentially concentrates the heating of the target medium at the target volume VT as compared to heating outside of the target volume VT, with corresponding differentials in radiation-induced thermoelastic expansion and thermoelastically-generated acoustic wave strength. In some embodiments, the particle energy deposition outside of the target volume VT is insufficient to induce thermoelastic expansion of the target medium there, or is insufficient to induce thermoelastic expansion of the target medium there that is sufficient to generate an acoustic wave detectable by the detection system 150.

In some embodiments, the duration of the pulse of the proton beam 260 is in the range of from 10 nanoseconds to 200 nanoseconds.

In some embodiments, the proton energy of the proton beam 260 is in the range of from 5 MeV to 50 MeV.

In some embodiments, the depth D2 of the beam focal point 268 is in the ranges described above for the depth D1 of the beam focal point 168.

In some embodiments, the area AT2 of the proton beam 266 at the focal point 268 is in the same ranges as described above for the area AT1 of the electron beam 166 at the focal point 168.

In some embodiments, the incident proton beam 266 is laterally and/or depthwise scanned across the target 10 as discussed above for the incident electron beam 166. The scanning may be executed by the positioning system 140 and/or by adjusting parameters of the proton beam (e.g., the beam energy).

In some embodiments, the depth of the concentration of the particle energy deposition from the proton beam 260 is controlled or selected using Bragg peak calibration of the proton beam 260. More particularly, the energy of the proton beam 260 generated by the generator 220 is modulated such that the energies of the beam protons correspond to a Bragg peak of the protons occurring at the depth D2. In some embodiments, the depthwise scanning of the target 10 is executed by selectively modulating the Bragg peak calibration.

Figure 7:
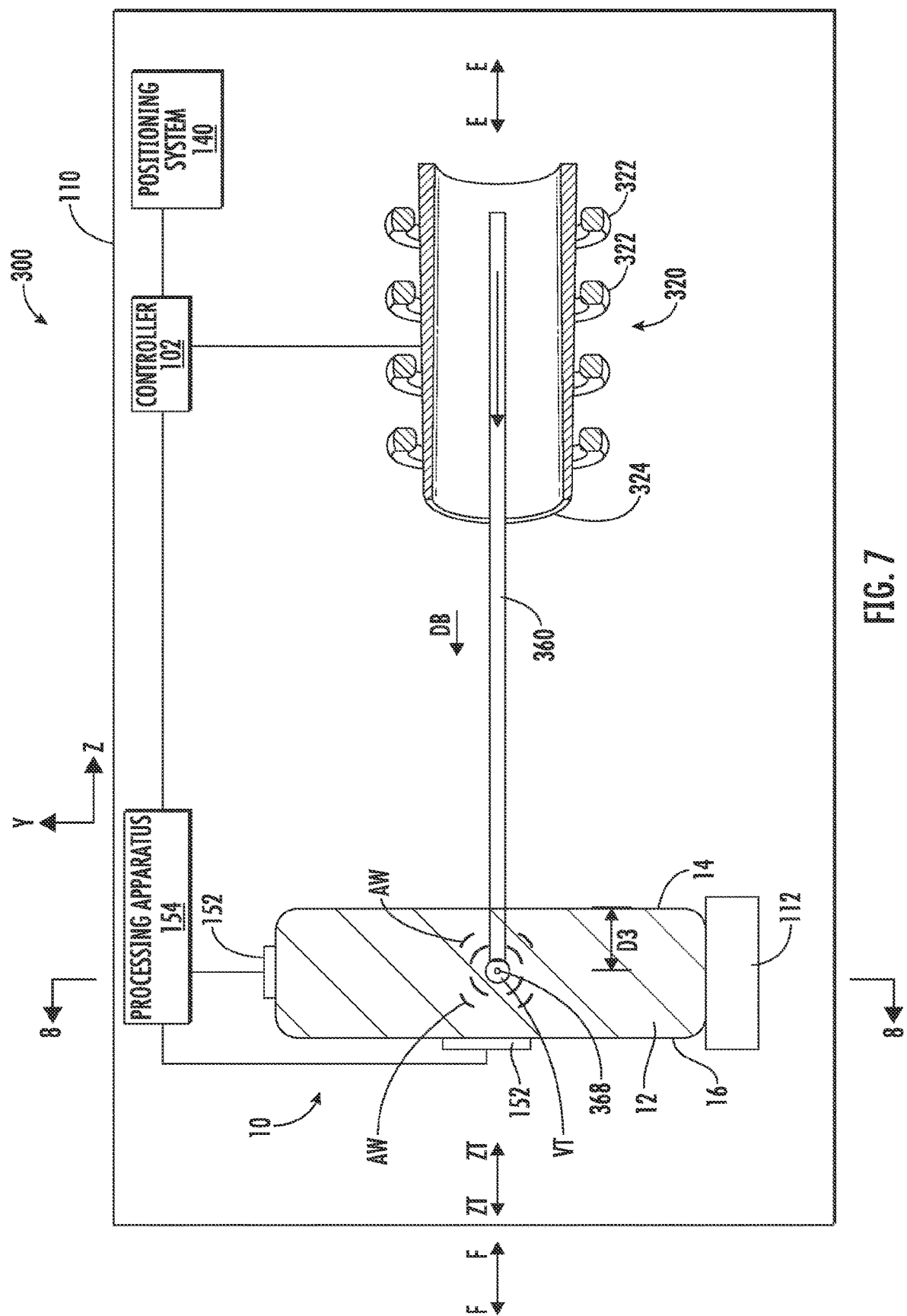
FIG. 7 is a schematic view of a PRIA system according to some embodiments.
Figure 8:
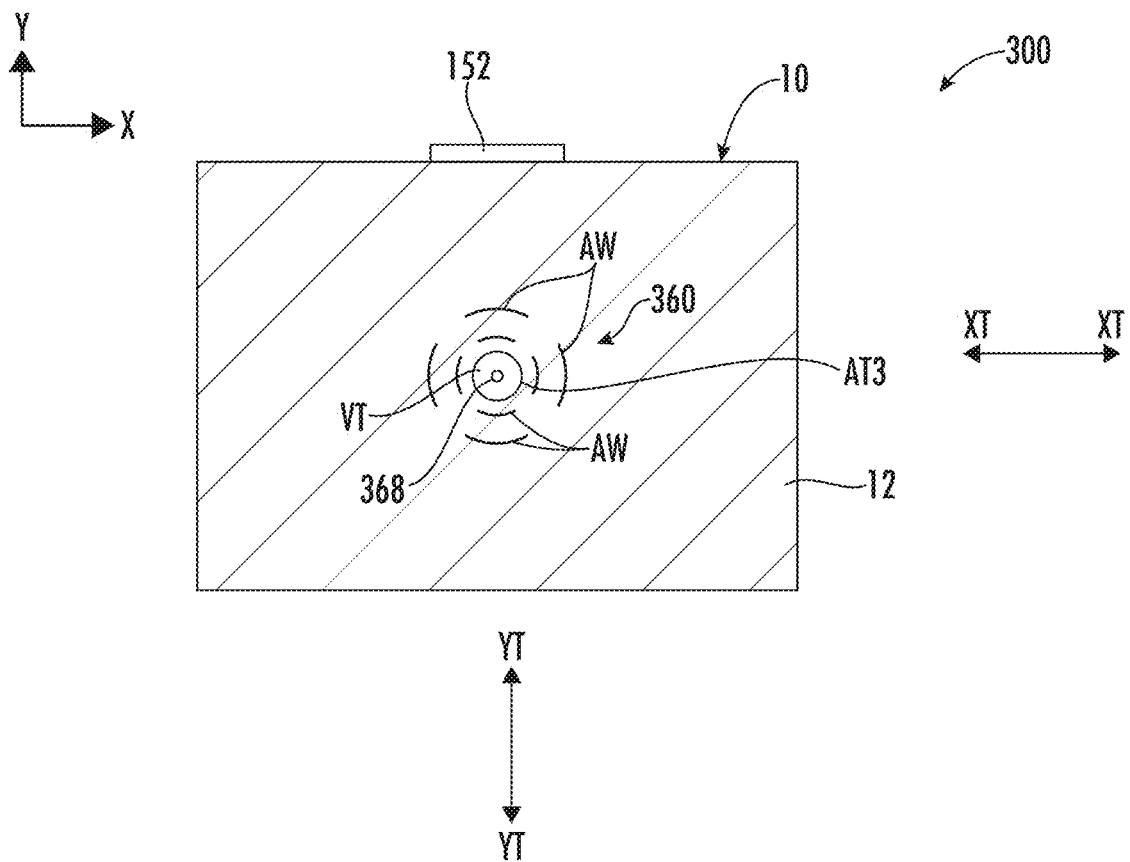
FIG. 8 is a schematic, cross-sectional view of the PRIA system of FIG. 7 taken along the line 8-8 of FIG. 7.

With reference to FIGS. 7 and 8, a PRIA system 300 according to further embodiments is shown therein. The system 300 can be used to nondestructively evaluate a target 10, for example. The PRIA system 300 is configured to irradiate the target 10 with a collimated energetic proton beam 360. The system 300 is configured to control the proton beam 360 relative to the target 10 in three dimensions, which are indicated for reference as a Z-axis, an X-axis, and a Y-axis.

The PRIA system 300 may be constructed and operated in the same manner as the PRIA system 200, except as discussed below.

The PRIA system 300 includes a proton beam generator 320 in place of the proton beam generator 220. A separate lens system corresponding to the lens system 230 is not provided.

The proton beam generator 320 is configured to generate a collimated beam 360 of energetic protons. The proton beam generator 320 may be any suitable device for generating a pulsed, collimated proton beam as discussed herein. In some embodiments, the proton beam generator 320 is a particle accelerator that uses electromagnetic fields to propel protons to high velocities and energies out of a generator outlet 324 along an emission axis E-E. The electromagnetic fields may be generated using electromagnets 322, for example.

The proton beam generator 320 may differ from the proton beam generator 220 in that the proton beam 360 is collimated or more tightly collimated by the proton generator 330.

The PRIA system 300 may be used as follows. The target 10 is mounted on the target holder 112. The proton beam generator 320 is operated to generate a pulse or sequential pulses of the proton beam 360 that irradiate the target 10. The energy of the proton beam 360 and/or the spatial positions of the proton beam generator 320 and the target 10 are set, selected or adjusted to position the Bragg peak 368 of the proton beam 360 at a selected or prescribed target location in the target 10. The target location is spatially located at a subsurface location within the target body 12 between the surfaces 14 and 16.

More particularly, the energetic protons of the proton beam 360 penetrate through the front surface 14 and the subsurface bulk or medium of the target body 12 to a location or locations substantially coincident with the beam Bragg peak 368. The protons of the proton beam 360 incident at and closely proximate the Bragg peak 368 deposit their energy in the target medium in a target volume VT at or closely surrounding the Bragg peak 368. This time varied energy absorption induces a rapid thermoelastic expansion of the target medium 12 in the target volume VT. This thermoelastic expansion in turn generates a corresponding thermoacoustic wave AW. The thermoacoustic wave AW propagates through the target medium 12 and is incident on one or more of the sensors 152. The thermoacoustic wave AW is converted by the sensor 152 to a signal that is data processed (e.g., by the controller 102) to characterize the target medium 12.

In some embodiments, the thermoelastic acoustic wave AW is an ultrasonic wave. In some embodiments, the thermoelastic acoustic wave AW is an ultrasonic wave having a frequency range that is dependent on the target material and geometry characteristics, as well as the characteristics of the proton beam 360. In some embodiments, the acoustic wave AW has multiple frequency components, ranging from 1 MHz to 100 GHz.

Notably, as a result of the well-defined, collimated proton beam 360, the particle energy deposition from the proton beam 360 is concentrated in the subsurface target volume VT. The Bragg peak 368 and the target volume VT are located at a positive, non-zero depth D3 (i.e., the penetration depth) from the front surface 14. Additionally, a target area AT3 (i.e., the lateral area in a plane orthogonal to the incident beam axis F-F) of the particle energy deposition concentration is constrained. In this manner, the particle energy deposition concentration is constrained in its depth and its lateral extent.

The discussion above regarding the concentration of particle energy deposition from the focused proton beam 260 likewise applies to the collimated proton beam 360, and the PRIA system 300 and related method. In some embodiments, throughout the target volume VT the energy density of the proton beam particle energy deposition from the collimated proton beam 360 is at least 10 times the energy density of the proton beam particle energy deposition at the front surface 14.

The discussion above regarding the effects of the differential concentration of the particle energy deposition in the target volume VT from the focused proton beam 260 likewise applies to the collimated proton beam 360, and the PRIA system 300 and related method. Likewise, in some embodiments, the particle energy deposition outside of the target volume VT is insufficient to induce thermoelastic expansion of the target medium there, or is insufficient to induce thermoelastic expansion of the target medium there that is sufficient to generate an acoustic wave detectable by the detection system 150.

In some embodiments, the duration of the pulse of the proton beam 360 is in the range of from 10 nanoseconds to 200 nanoseconds.

In some embodiments, the proton energy of the proton beam 360 is in the range of from 5 MeV to 50 MeV.

In some embodiments, the depth D3 of the Bragg peak 368 is in the ranges described above for the depth D1 of the beam focal point 168.

In some embodiments, the area AT3 of the proton beam 360 at the Bragg peak 368 is in the same ranges as described above for the area AT1 of the electron beam 166 at the focal point 168.

In some embodiments, the incident proton beam 360 is laterally and/or depthwise scanned across the target 10 as discussed above for the incident electron beam 166. The scanning may be executed by the positioning system 140 and/or by adjusting parameters of the proton beam (e.g., the beam energy).

In some embodiments, the depth of the concentration of the particle energy deposition from the proton beam 360 is controlled or selected using Bragg peak calibration of the proton beam 360 (e.g., as described above for the proton beam 260). In some embodiments, the depthwise scanning of the target 10 is executed by selectively modulating the Bragg peak calibration.

Figure 9:
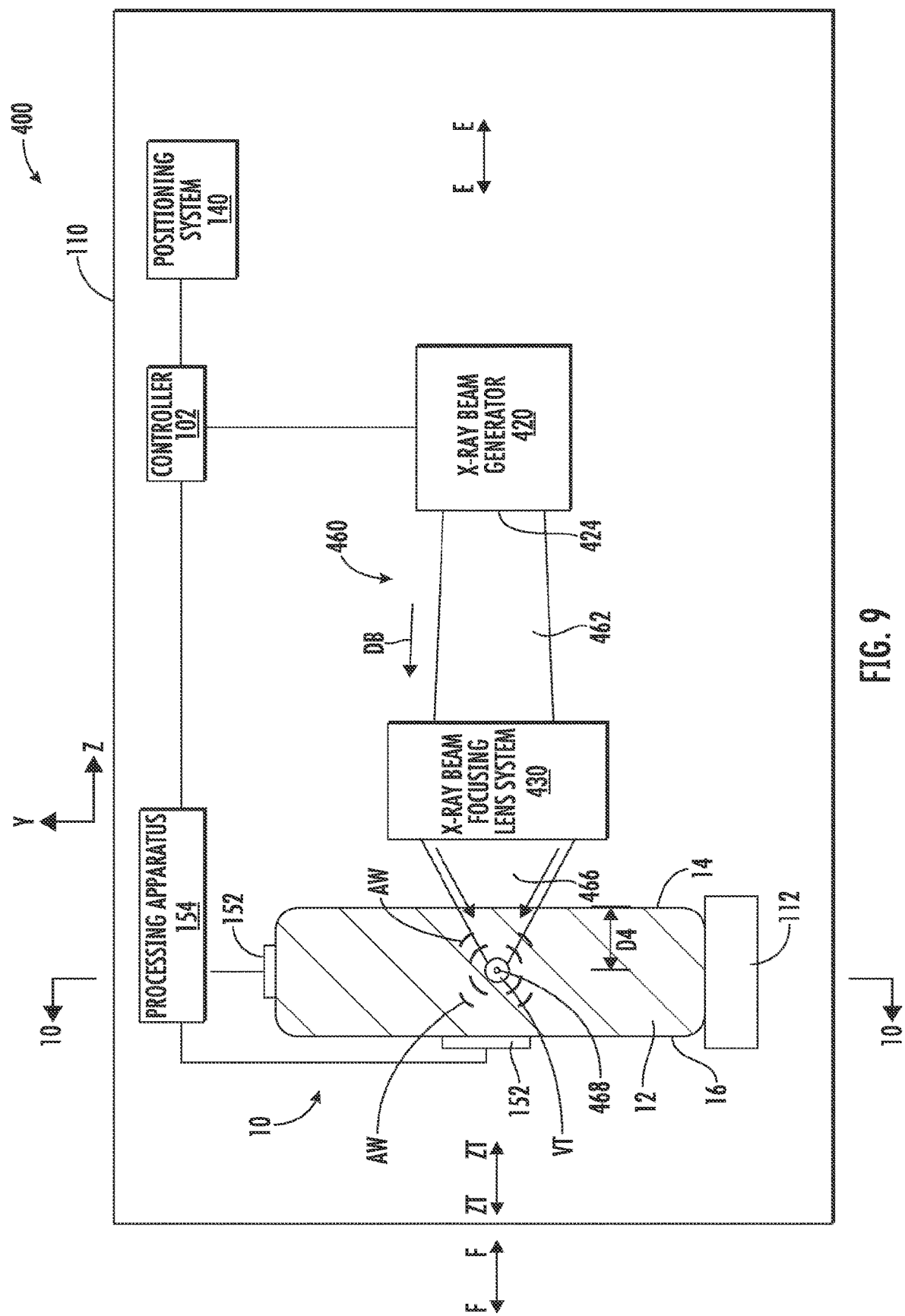
FIG. 9 is a schematic view of a PRIA system according to some embodiments.
Figure 10:
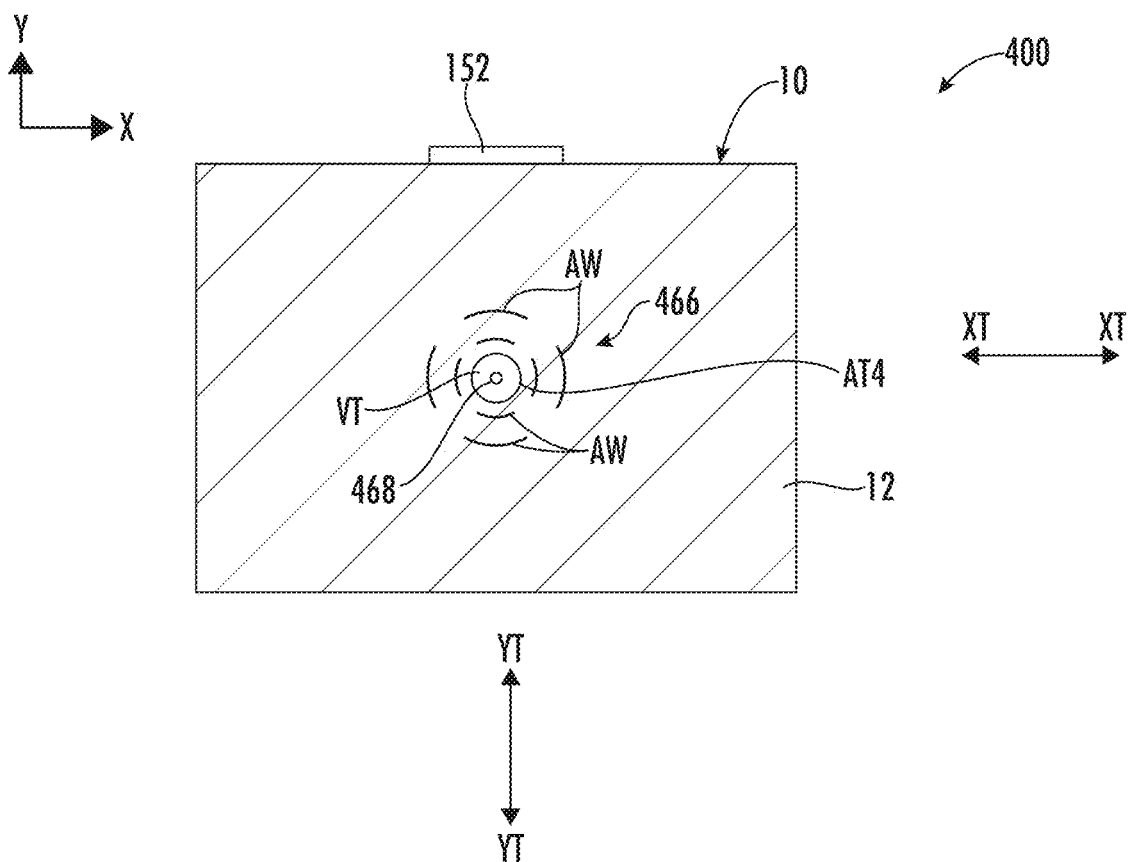
FIG. 10 is a schematic, cross-sectional view of the PRIA system of FIG. 9 taken along the line 10-10 of FIG. 9.

With reference to FIGS. 9 and 10, a PRIA system 400 according to further embodiments is shown therein. The system 400 can be used to nondestructively evaluate a target 10, for example. The PRIA system 400 is configured to irradiate the target 10 with a focused X-ray beam 460. The system 400 is configured to control the X-ray beam 460 relative to the target 10 in three dimensions, which are indicated for reference as a Z-axis, an X-axis, and a Y-axis.

The system 400 may be constructed and operated in the same manner as the PRIA system 100, except as discussed below.

The PRIA system 400 includes an X-ray beam generator 420 in place of the electron beam generator 120.

The X-ray beam generator 420 is configured to generate a beam of X-rays (i.e., a beam of high energy photons). The X-ray beam generator 420 may be any suitable device for generating a pulsed X-ray beam as discussed herein. In some embodiments, the X-ray beam generator 420 is an X-ray tube that uses high electrical power to emit and propel high energy photons out of a generator outlet 424 along an emission axis E-E.

The PRIA system 400 also includes an X-ray beam focusing lens system 430.

The X-ray beam 460 propagates in a beam direction DB from the generator 420 to the target 10. The X-ray beam 460 includes multiple sections 462, 466 arranged serially from the generator 420 to the target 10. The X-ray beam 460 includes a parallel beam 462 extending from the generator outlet 424 to the lens system 430. The parallel beam 462 is converted to a focused beam 466 by the lens system 430. The focused beam 466 is focused by the lens system 430 to a focal point 468.

The PRIA system 400 may be used as follows. The target 10 is mounted on the target holder 112. The X-ray beam generator 420 is operated to generate a pulse or sequential pulses of the X-ray beam 460. The energy of the X-ray beam 460 and/or the spatial positions of the X-ray beam generator 420, the lens system 430, and the target 10 are set, selected or adjusted to position the beam focal point 468 at a selected or prescribed target location in the target 10. The target location is spatially located at a subsurface location within the target body 12 between the surfaces 14 and 16.

More particularly, the energetic photons of the X-ray beam 460 penetrate through the front surface 14 and the subsurface bulk or medium of the target body 12 to a location or locations substantially coincident with the beam focal point 468. The photons of the X-ray beam 460 incident at and closely proximate the beam focal point 468 deposit their energy in the target medium in a target volume VT at or closely surrounding the beam focal point 468. This time varied energy absorption induces a rapid thermoelastic expansion of the target medium in the target volume VT. This thermoelastic expansion in turn generates a corresponding thermoacoustic wave AW. The thermoacoustic wave AW propagates through the target medium 12 and is incident on one or more of the sensors 152. The thermoacoustic wave AW is converted by the sensor 152 to a signal that is data processed (e.g., by the controller 102) to characterize the target medium 12.

In some embodiments, the thermoelastic acoustic wave AW is an ultrasonic wave. In some embodiments, the thermoelastic acoustic wave AW is an ultrasonic wave having a frequency range that is dependent on the target material and geometry characteristics, as well as the characteristics of the X-ray beam 460. In some embodiments, the acoustic wave AW has multiple frequency components, ranging from 1 MHz to 100 GHz.

Notably, as a result of the well-defined, focused X-ray beam 460, the particle energy deposition from the X-ray beam 460 is concentrated in the subsurface target volume VT. The beam focal point 468 and the target volume VT are located at a positive, non-zero depth D4 (i.e., the penetration depth) from the front surface 14. Additionally, a target area AT4 (i.e., the lateral area in a plane orthogonal to the incident beam axis F-F) of the particle energy deposition concentration is constrained. In this manner, the particle energy deposition concentration is constrained in its depth and its lateral extent.

It will be appreciated that a portion of the beam particle (photon) energy from the X-ray beam 460 will be deposited in the target medium between the surface 14 and the target volume VT, and a portion of the particle energy from the X-ray beam 460 may be deposited in the target medium between the surface 16 and the target volume VT. As used herein, "the particle energy deposition from the X-ray beam 460 is concentrated" means that the energy density ([beam particle energy absorbed by target medium] per [unit volume]) of the particle energy deposition from the X-ray beam 460 is greatest in the target volume VT. That is, the target medium in the target volume VT absorbs more particle energy per unit volume than the medium in any other volume of the target 10. In some embodiments, throughout the target volume VT the energy density of the X-ray beam particle energy deposition from the focused X-ray beam 460 is at least 50 times the energy density of the X-ray beam particle energy deposition at the front surface 14.

As discussed above with regard to the PRIA system 100 and related method, the differential concentration of the particle energy deposition in the target volume VT correspondingly differentially concentrates the heating of the target medium at the target volume VT as compared to heating outside of the target volume VT, with corresponding differentials in radiation-induced thermoelastic expansion and thermoelastically-generated acoustic wave strength. In some embodiments, the particle energy deposition outside of the target volume VT is insufficient to induce thermoelastic expansion of the target medium there, or is insufficient to induce thermoelastic expansion of the target medium there that is sufficient to generate an acoustic wave detectable by the detection system 150.

In some embodiments, the duration of the pulse of the X-ray beam 460 is in the range of from 10 nanoseconds to 100 nanoseconds.

In some embodiments, the photon energy of the X-ray beam 460 is in the range of from 30 keV to 150 keV.

In some embodiments, the depth D4 of the beam focal point 468 is in the ranges described above for the depth D1 of the beam focal point 168.

In some embodiments, the area AT4 of the X-ray beam 466 at the focal point 668 is in the same ranges as described above for the area AT1 of the electron beam 166 at the focal point 168.

In some embodiments, the incident X-ray beam 460 is laterally and/or depthwise scanned across the target 10 as discussed above for the incident electron beam 166. The scanning may be executed by the positioning system 140 and/or by adjusting parameters of the X-ray beam (e.g., the beam energy).

Figure 11:
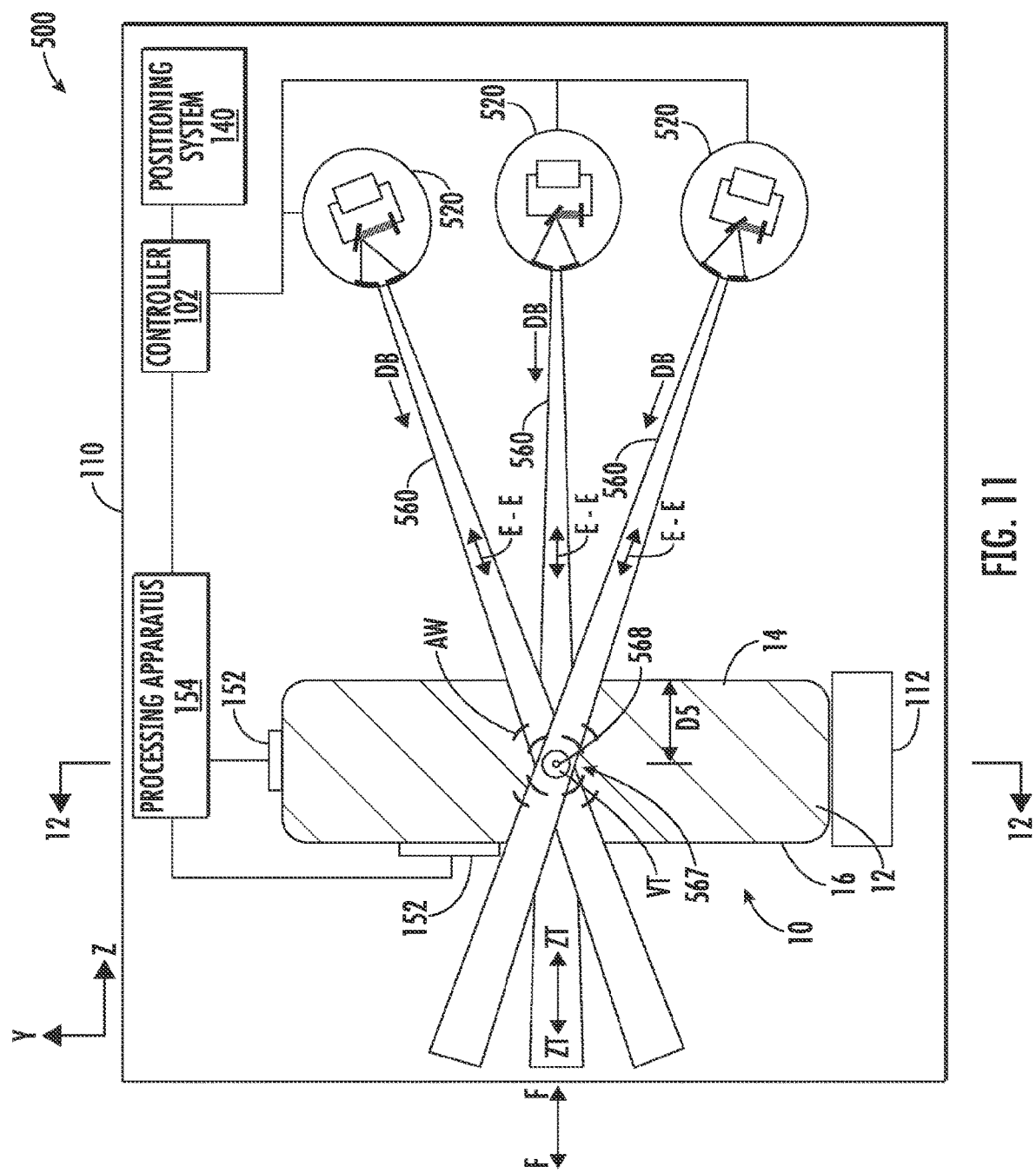
FIG. 11 is a schematic view of a PRIA system according to some embodiments.
Figure 12:
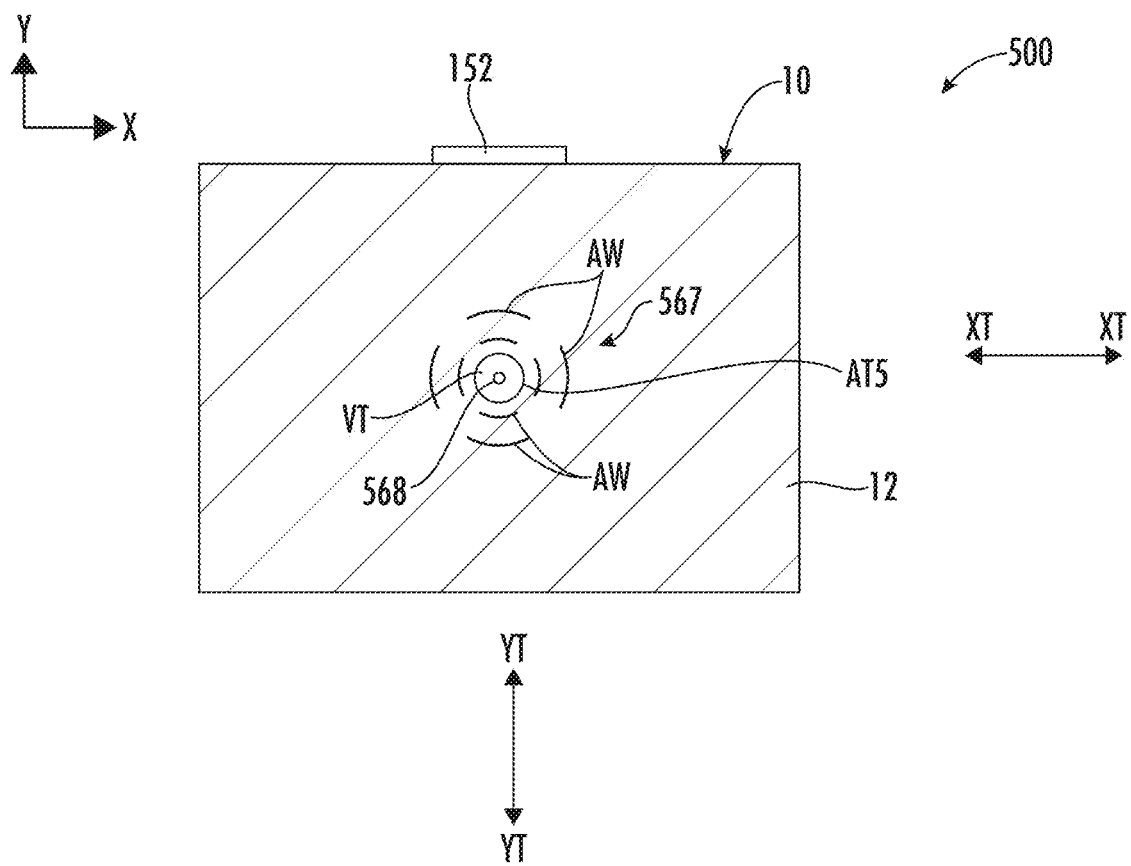
FIG. 12 is a schematic, cross-sectional view of the PRIA system of FIG. 11 taken along the line 12-12 of FIG. 11.

With reference to FIGS. 11 and 12, a PRIA system 500 according to further embodiments is shown therein. The system 500 can be used to nondestructively evaluate a target 10, for example. The PRIA system 500 is configured to irradiate the target 10 with a plurality of separate X-ray beams 560. The system 500 is configured to control the X-ray beams 560 relative to the target 10 in three dimensions, which are indicated for reference as a Z-axis, an X-axis, and a Y-axis.

The system 500 may be constructed and operated in the same manner as system 400, except as discussed below.

The PRIA system 500 includes multiple X-ray beam generators 520 in place of the single X-ray beam generators 420. The PRIA system 500 does not include a focusing lens system corresponding to the lens system 430.

Each X-ray beam generator 520 may be configured and operate as described for the X-ray beam generator 420. Each X-ray beam generator 520 generates a respective beam 560 of X-rays along its emission axis E-E. Each X-ray beam 560 propagates in a beam direction DB from its generator 520 to the target 10. Each X-ray beam 560 may be a parallel X-ray beam.

The X-ray beams 560 are relatively positioned and angled or directed such that they intersect or converge at an intersection point 568.

The PRIA system 500 may be used as follows. The target 10 is mounted on the target holder 112. The X-ray beam generators 520 are operated to generate a pulse or sequential pulses of the multiple X-ray beams 560 substantially simultaneously. The energies of the X-ray beams 560 and/or the spatial positions of the X-ray beam generators 520 and the target 10 are set, selected or adjusted to position the beam intersection point 568 at a selected or prescribed target location in the target 10. The target location is spatially located at a subsurface location within the target body 12 between the surfaces 14 and 16.

More particularly, the energetic photons of the X-ray beams 560 penetrate through the front surface 14 and the subsurface bulk or medium of the target body 12 to a location or locations substantially coincident with the beam intersection point 568. The photons of the X-ray beams 560 incident at and closely proximate the beam intersection point 568 deposit their energy in the target medium in a target volume VT at or closely surrounding the beam intersection point 568. This time varied energy absorption induces a rapid thermoelastic expansion of the target medium 12 in the target volume VT. This thermoelastic expansion in turn generates a corresponding thermoacoustic wave AW. The thermoacoustic wave AW propagates through the target medium 12 and is incident on one or more of the sensors 152. The thermoacoustic wave AW is converted by the sensor 152 to a signal that is data processed (e.g., by the controller 102) to characterize the target medium 12.

In some embodiments, the thermoelastic acoustic wave AW is an ultrasonic wave. In some embodiments, the thermoelastic acoustic wave AW is an ultrasonic wave having a frequency range that is dependent on the target material and geometry characteristics, as well as the characteristics of the X-ray beams 560. In some embodiments, the acoustic wave AW has multiple frequency components, ranging from 1 MHz to 100 GHz.

The particle energy from each of the multiple X-ray beams 560 is deposited at the beam intersection point 568, so that the particle energy deposited in the target volume VT is an accumulation from each X-ray beam 560 (i.e., the combined X-ray beam 567). The particle energy deposition from the plurality of X-ray beams 560 is thereby concentrated in the subsurface target volume VT. The beam intersection point 568 and the target volume VT are located at a positive, non-zero depth D5 (i.e., the penetration depth) from the front surface 14. Additionally, a target area AT5 (i.e., the lateral area in a plane orthogonal to the incident beam axis F-F) of the particle energy deposition concentration is constrained. In this manner, the particle energy deposition concentration is constrained in its depth and its lateral extent.

While particle energy from the X-ray beams 560 is also deposited in the target medium 12 at other locations along the paths of the X-ray beams 560, those particle energy depositions are relatively widely spatially distributed and not concentrated.

It will be appreciated that a portion of the beam particle (photon) energy from each of the multiple X-ray beams 560 will be deposited in the target medium between the surface 14 and the target volume VT, and a portion of the particle energy from each of the X-ray beams 560 may be deposited in the target medium between the surface 16 and the target volume VT. As used herein, "the particle energy deposition from the plurality of X-ray beams 560 is concentrated" means that the energy density ([beam particle energy absorbed by target medium] per [unit volume]) of the combined particle energy deposition from the X-ray beams 560 is greatest in the target volume VT. That is, the target medium in the target volume VT absorbs more particle energy per unit volume than the medium in any other volume of the target 10. In some embodiments, throughout the target volume VT the energy density of the X-ray beam particle energy deposition from the combined X-ray beams 560 is at least 8 times the energy density of the X-ray beam particle energy deposition at the front surface 14.

As discussed above with regard to the PRIA system 100 and related method, the differential concentration of the particle energy deposition in the target volume VT correspondingly differentially concentrates the heating of the target medium at the target volume VT as compared to heating outside of the target volume VT, with corresponding differentials in radiation-induced thermoelastic expansion and thermoelastically-generated acoustic wave strength. In some embodiments, the particle energy deposition outside of the target volume VT is insufficient to induce thermoelastic expansion of the target medium there, or is insufficient to induce thermoelastic expansion of the target medium there that is sufficient to generate an acoustic wave detectable by the detection system 150.

In some embodiments, the duration of the pulse of each of the X-ray beams 560 is in the range of from 10 nanoseconds to 200 nanoseconds.

In some embodiments, the photon energy of each of the X-ray beams 560 is in the range of from 20 keV to 300 keV.

In some embodiments, the depth D5 of the beam intersection point 568 is in the ranges described above for the depth D1 of the beam focal point 168.

In some embodiments, the area AT5 of the combined X-ray beam 567 at the beam intersection point 568 (i.e., the collective area of the X-ray beams 560 at the beam intersection point 568) is in the same ranges as described above for the area AT1 of the electron beam 166 at the focal point 168.

In some embodiments, the beam intersection point 568 is laterally and/or depthwise scanned across the target 10 as discussed above for the incident electron beam 166. The scanning may be executed by the positioning system 140 and/or by adjusting parameters of the X-ray beam (e.g., the beam energy).

In each of the PRIA systems 200, 300, 400, 500 and methods executed thereby, the thermoacoustic waves AW that propagate through the target medium 12 and are incident on the sensor(s) 152 may be received by the sensor 152, converted by the sensor 152, and then data processed (e.g., by the controller 102 and/or the processing apparatus 154) to characterize the target medium 12. The processing and characterization may include any suitable processes and techniques for characterizing or evaluating the material or structure of the target medium 12. For example, the PRIA systems 200, 300, 400, 500 may conduct the foregoing PRIA procedure (i.e., irradiate the target 10 at a subsurface location, and detect the thermoacoustic waves induced thereby) at multiple different locations within the target 10. That is, the PRIA systems 200, 300, 400, 500 can be used to sample multiple locations in the target 10. The acoustic signals corresponding to each sampling can then be compared or mapped by a processor. In this way, the PRIA systems 200, 300, 400, 500 can identify, detect or show the existence or presence and relative locations of discontinuities in the target 10, such as defects, voids, material variations, inclusions, or different layers.

In some embodiments, the PRIA systems 100-500 are used to characterize the magnitude or size of a defect in the target 10.

In some embodiments, the PRIA systems 100-500 are used to characterize a bond between multiple layers in the target 10. In some embodiments, the layers of the target joined by the characterized bond are formed of the same materials as one another. In some embodiments, the layers of the target joined by the characterized bond are formed of different materials from one another. In some embodiments, the layers of the target joined by the characterized bond are formed of materials having different orientations from one another.

As discussed above, PRIA systems and methods can use particle accelerators (which use electromagnetic fields to propel charged particles to high velocities and energies) or X-ray sources (which use a variety of methods to produce high energy photons). Both sources are desirable options for generating subsurface ultrasonic waves through the thermoelastic effect for the following reasons.

Energetic massive particles (e.g., electrons and protons) can penetrate deep into a material, but preferentially deposit energy below the surface of the substance in a phenomenon known as the Bragg peak. This effect is especially pronounced in hadron accelerators, such as a proton accelerator, but is also present with electrons.

Particle beams can be easily focused with the use of electromagnetic lenses. This allows a focal point to be set up within a material, concentrating the particle energy deposition below the surface of the material, e.g., as discussed above with reference to FIGS. 1-12.

X-rays can either be focused using specialized lenses (e.g., as discussed above with reference to FIGS. 9 and 10), or multiple sources can use straight beams which can be directed to converge in a subsurface location within the material (e.g., as discussed above with reference to FIGS. 11 and 12).

Particle beams (electron, proton, or X-ray) can be quickly and easily scanned across a surface with the use of electromagnetic lenses. Particle beams can be easily pulsed at frequencies from DC to 100s of MHz, allowing for the frequency modulation necessary to produce ultrasonic waves. X-rays can be easily steered by moving the source heads in small increments. Since X-rays are usually produced by small electron beams, they are usually just as easily pulsed as direct electron beam sources.

Advances in accelerator physics have produced tabletop-sized particle accelerators capable of deep penetration (several cm).

Figure 13:
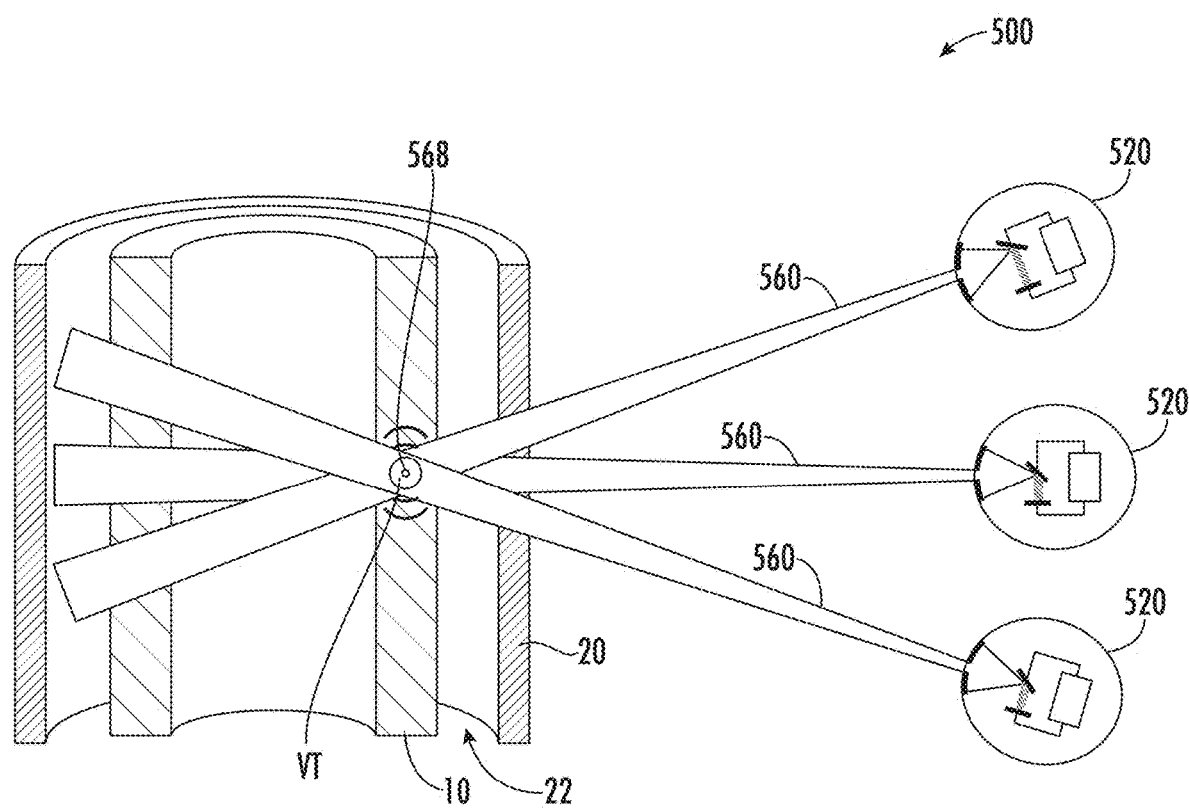
FIG. 13 is a schematic view of the PRIA system of FIG. 11 being used to evaluate a target through an intervening object.

PRIA methods and systems may also be used to effectively inspect multi-wall vessels and other structures with features that may impede ultrasonic waves. For example, FIG. 13 shows the PRIA system 500 being used to conduct nondestructive evaluation of a double-walled or obstructed target. In FIG. 13, an obstructing or intervening object 20 is interposed between the target 10 and the X-ray beam sources 520. A void or gas-filled gap 22 is defined between the object 20 and the target. The spatially distributed X-ray beams 560 are able to pass through the object 20 and intersect (at beam intersection point 568) and concentrate their particle energy deposition in the target volume VT of the target 10, in the same manner that they pass through intervening material of the target 10 in the example of FIG. 3.

Figure 14:
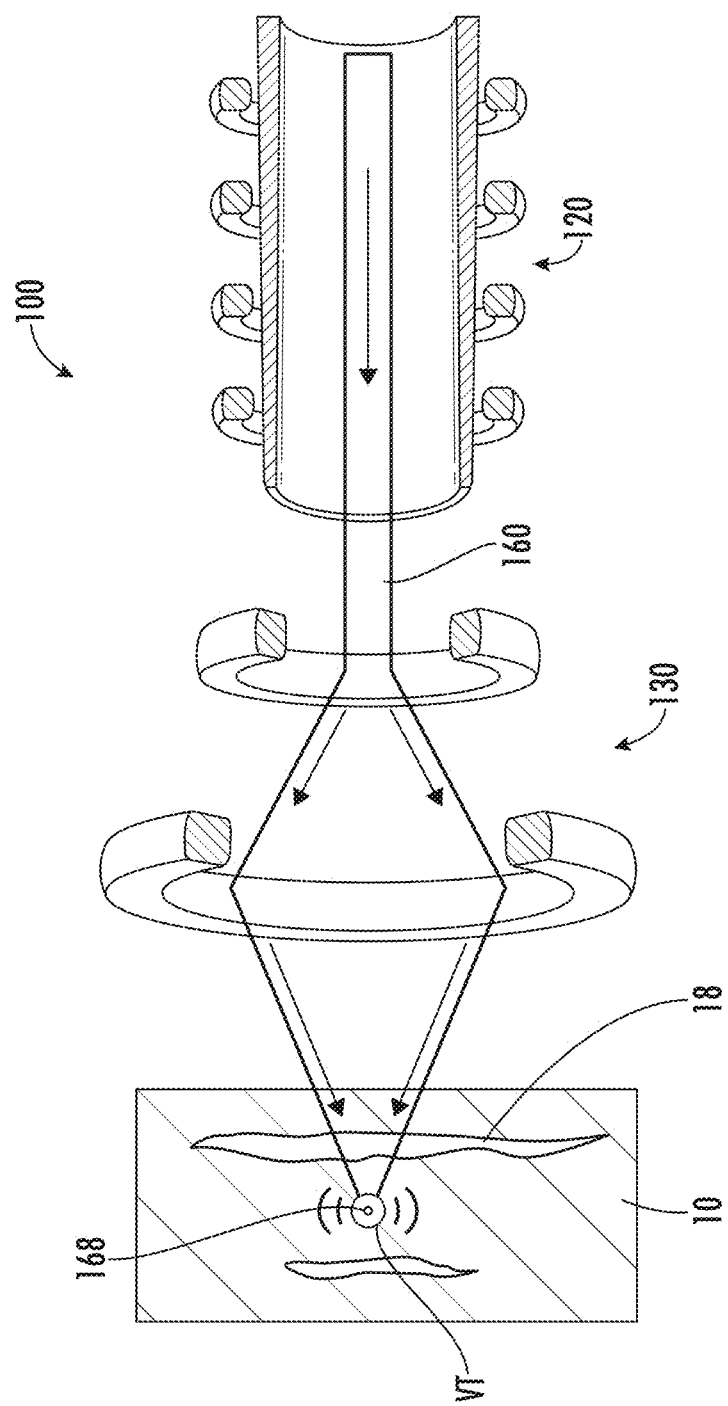
FIG. 14 is a schematic view of the PRIA system of FIG. 1 being used to evaluate a target including an internal void.

By way of further example, FIG. 14 shows the PRIA system 100 being used to conduct nondestructive evaluation of a monolithic target 10 having an internal shadowing defect in the form of a void 18. The focused electron beam 160 is able to pass through the void 18 concentrate its particle energy deposition in the target volume VT of the target 10.

EXAMPLES

The inventors used the GEANT4 (GEometry ANd Tracking version 4; a particle tracking Monte Carlo package that simulates particle interactions in matter) to simulate PRIA methods according to embodiments of the invention.

Figure 15:
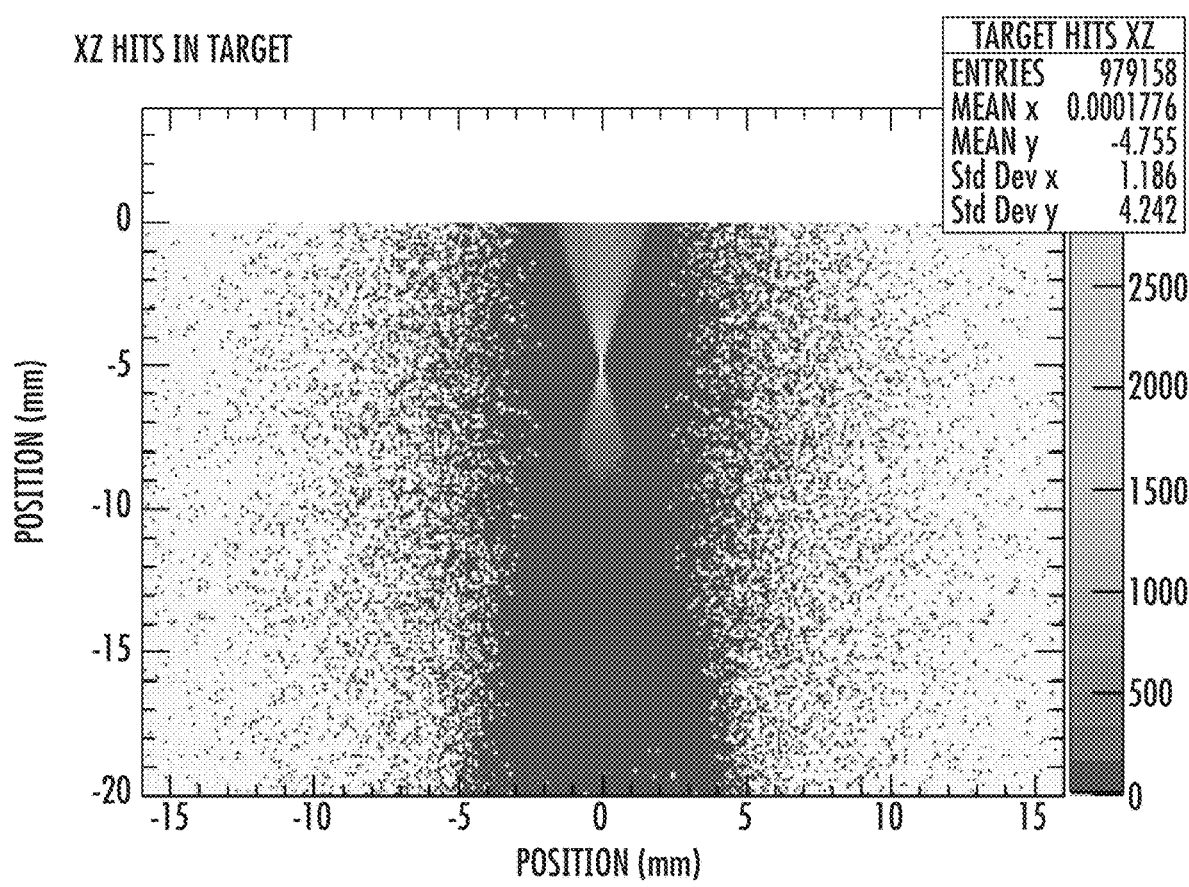
FIG. 15 is a plot of particle interaction number for a simulated PRIA method according to some embodiments using a focused X-ray beam.

FIG. 15 is a plot of particle interaction number (which is directly related to energy deposition) for a focal region generated by a focused (lensed) 75 keV X-ray beam. The chosen focal point of the X-ray beam is 5 mm into the material.

Figure 16:
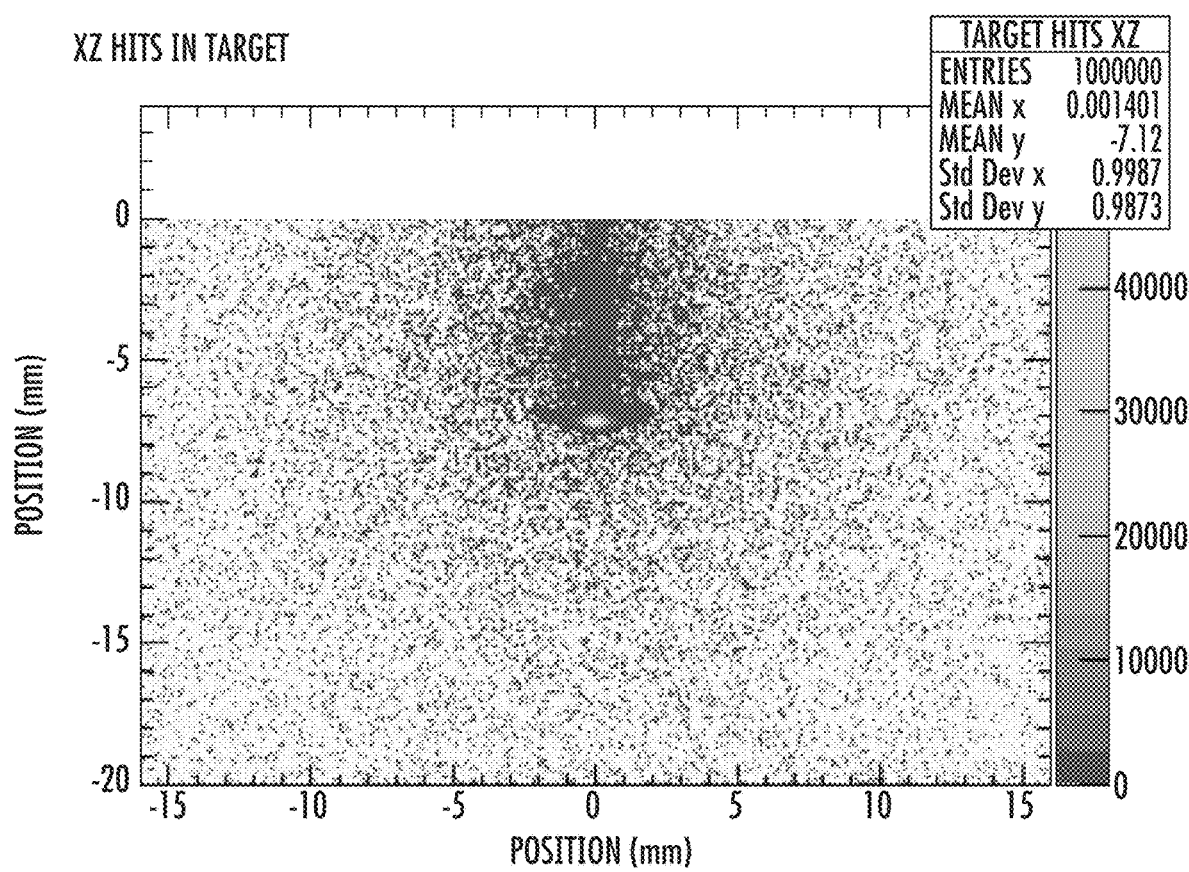
FIG. 16 is a plot of particle interaction number for a simulated PRIA method according to some embodiments using a proton beam without a lens system.

FIG. 16 is a plot of particle interaction number for a focal region generated by a 50 MeV proton beam, without lensing.

Figure 17:
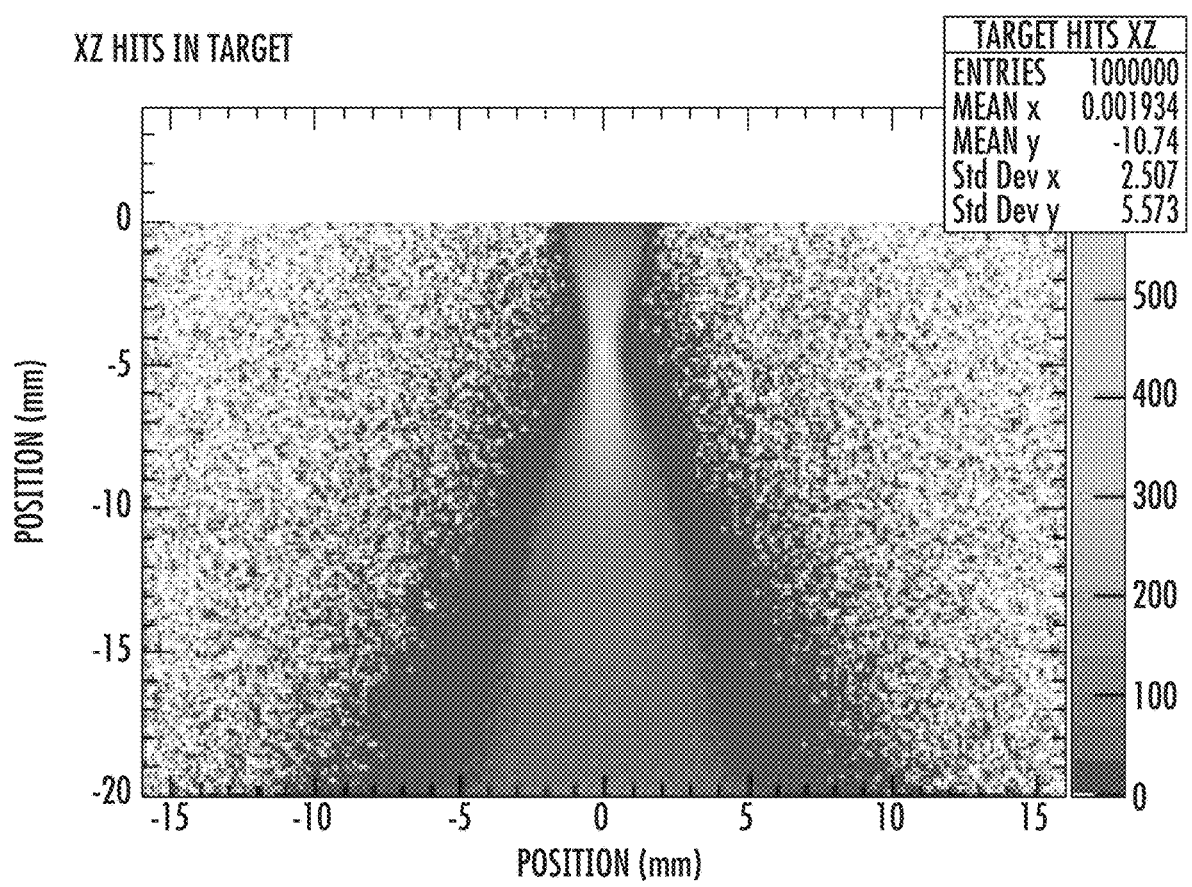
FIG. 17 is a plot of particle interaction number for a simulated PRIA method according to some embodiments using a focused electron beam.

FIG. 17 is a plot of particle interaction number for a focal region generated by a focused, 50 MeV electron beam. The chosen focal point of the electron beam is 5 mm into the material.

Inducing subsurface ultrasonic waves in accordance with embodiments of the invention can enable hybridizing with well-known technologies, such as pre-installed thin-film piezoelectric sensors that would otherwise not have the necessary characteristics to produce usable ultrasonic signals. Future innovations in similar non-contact technologies that allow for the detection of ultrasonic waves in structures with air gaps can likewise be hybridized with PRIA systems according to embodiments of the invention. In some embodiments, a transducer or transducers (corresponding to the transducers 152) are pre-installed internally within the target 10. This may be particularly beneficial in cases where the target or internal layers or components thereof cannot be reached during an operation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed:

1. A method for evaluating a target, the target having a surface, the method comprising:
    pulsing a defined, energetic particle beam through the surface and into the target such that a particle energy deposition from the particle beam is concentrated in a subsurface target volume within a target medium of the target;
    wherein the particle energy deposition induces a thermoelastic expansion of the target medium in the target volume that generates a corresponding acoustic wave; and
    detecting the acoustic wave from the target medium; wherein:
        the particle beam is an electron beam, a proton beam, or an X-ray beam; and
        the method includes focusing the particle beam with a focal point located in the target medium at a positive, nonzero depth from the surface to concentrate the particle energy deposition from the particle beam in the target medium in the target volume.

2. The method of claim 1 wherein the acoustic wave is an ultrasonic wave.

3. The method of claim 1 wherein the particle beam is an electron beam.

4. The method of claim 3 wherein focusing the electron beam includes focusing the electron beam at the focal point using a lens system.

5. The method of claim 4 wherein the lens system includes an electromagnetic lens.

6. The method of claim 5 wherein:
    the electromagnetic lens is a defocusing/focusing lens; and focusing the electron beam includes focusing a collimated electron beam at the focal point using the defocusing/focusing lens.

7. The method of claim 1 wherein the particle beam is a proton beam.

8. The method of claim 7 including selecting an energy of the proton beam such that a Bragg peak of the proton beam is located at a selected depth in the target volume.

9. The method of claim 1 wherein the particle beam is an X-ray beam.

10. The method of claim 9 wherein focusing the X-ray beam includes focusing the X-ray beam at the focal point using a lens system.

11. The method of claim 1 including:
scanning the particle beam across the target such that the particle energy deposition from the particle beam is sequentially concentrated in a series of subsurface target volumes within the target; and
pulsing the particle beam while scanning the particle beam across the target.

12. The method of claim 1 wherein detecting the acoustic wave from the target volume includes detecting the acoustic wave using a transducer that converts the acoustic wave to an electrical signal.

13. The method of claim 12 including processing the electrical signal to characterize the target medium.

14. The method of claim 13 wherein processing the electrical signal to characterize the target medium includes identifying a presence of a discontinuity in the target.

15. The method of claim 13 wherein processing the electrical signal to characterize the target medium includes characterizing a size of a defect in the target.

16. The method of claim 13 wherein processing the electrical signal to characterize the target medium includes characterizing a bond between multiple layers in the target.

17. The method of claim 12 wherein the transducer is in contact with the target.

18. The method of claim 12 wherein the transducer does not contact the target.

19. The method of claim 1 wherein:
the target includes an intervening object and a gap defined between the intervening object and the target medium; and
the particle beam passes through the intervening object and the gap prior to entering the target volume.

20. The method of claim 1 wherein:
the target medium includes a subsurface void defined therein; and
the particle beam passes through the void prior to entering the target volume.

21. A system for evaluating a target, the target having a surface, the system comprising:
an energetic particle beam generator configured to pulse a defined, energetic particle beam through the surface and into the target such that a particle energy deposition from the particle beam is concentrated in a subsurface target volume within a target medium of the target;
wherein the particle energy deposition induces a thermoelastic expansion of the target medium in the target volume that generates a corresponding acoustic wave; and
an ultrasonic sensor configured to detect the acoustic wave from the target medium;
wherein:
the particle beam is an electron beam, a proton beam, or an X-ray beam; and
the energetic particle beam generator is configured to focus the particle beam with a focal point located in the target medium at a positive, nonzero depth from the surface to concentrate the particle energy deposition from the particle beam in the target medium in the target volume.

22. The system of claim 21 wherein the acoustic wave is an ultrasonic wave.

23. The method of claim 1 wherein an energy density of the particle energy deposition at the target volume is at least 10 times an energy density of a particle energy deposition from the particle beam at the surface.

24. The system of claim 21 wherein the particle beam is an electron beam.

25. The system of claim 21 wherein the particle beam is a proton beam.

26. The system of claim 21 wherein the particle beam is an X-ray beam.

27. A method for evaluating a target, the target having a surface, the method comprising:
pulsing a defined proton beam through the surface and into the target such that a particle energy deposition from the proton beam is concentrated in a subsurface target volume within a target medium of the target;
wherein the particle energy deposition induces a thermoelastic expansion of the target medium in the target volume that generates a corresponding acoustic wave; and
detecting the acoustic wave from the target medium;
wherein:
the proton beam is a collimated proton beam; and
the method includes selecting an energy of the proton beam such that a Bragg peak of the proton beam is located in the target medium at a selected positive, nonzero depth from the surface to concentrate the particle energy deposition from the proton beam in the target medium in the target volume.

* * * * *